(12) United States Patent
Savage-Leuchs

(10) Patent No.: US 9,564,730 B2
(45) Date of Patent: Feb. 7, 2017

(54) OPTICAL GAIN FIBER HAVING FIBER SEGMENTS WITH DIFFERENT-SIZED CORES AND ASSOCIATED METHOD

(71) Applicant: Lockheed Martin Corporation, Bethesda, MD (US)

(72) Inventor: Matthias P. Savage-Leuchs, Woodinville, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 350 days.

(21) Appl. No.: 14/257,889

(22) Filed: Apr. 21, 2014

(65) Prior Publication Data

US 2016/0218477 A1    Jul. 28, 2016

Related U.S. Application Data

(62) Division of application No. 13/729,018, filed on Dec. 27, 2012, now Pat. No. 8,705,166, which is a division
(Continued)

(51) Int. Cl.
*H01S 3/00* (2006.01)
*H01S 3/067* (2006.01)
(Continued)

(52) U.S. Cl.
CPC ....... *H01S 3/06733* (2013.01); *B29C 47/0026* (2013.01); *B29C 47/707* (2013.01); *H01S 3/0675* (2013.01); *H01S 3/06754* (2013.01); *H01S 3/094007* (2013.01); *H01S 3/094053* (2013.01); *H01S 3/06716* (2013.01); *H01S 3/06729* (2013.01); *H01S 3/06741* (2013.01); *H01S 3/06745* (2013.01); *H01S 3/06758* (2013.01); *H01S 3/09415* (2013.01); *H01S 3/094019* (2013.01); *H01S 2301/02* (2013.01)

(58) Field of Classification Search
CPC ...... H01S 3/06758; H01S 3/07; H01S 3/2308; H01S 3/06783; H01S 3/086
USPC ......................................................... 359/333
See application file for complete search history.

(56) References Cited

U.S. PATENT DOCUMENTS

| 2007/0104431 A1* | 5/2007 | Di Teodoro | G02B 6/02347 385/123 |
| 2013/0230065 A1* | 9/2013 | Honea | G02B 6/02347 372/20 |

* cited by examiner

*Primary Examiner* — Mark Hellner
(74) *Attorney, Agent, or Firm* — Charles A. Lemaire; Jonathan M. Rixen; Lemaire Patent Law Firm, P.L.L.C.

(57) ABSTRACT

Apparatus and method for amplifying laser signals using segments of fibers of differing core diameters and/or differing cladding diameters to suppress amplified spontaneous emission and non-linear effects such as four-wave mixing (FWM), self-phase modulation, and stimulated Brillouin and/or Raman scattering (SBS/SRS). In some embodiments, different core sizes have different sideband spacings (spacing between the desired signal and wavelength-shifted lobes). Changing core sizes and providing phase mismatches prevent buildup of non-linear effects. Some embodiments further include a bandpass filter to remove signal other than the desired signal wavelength and/or a time gate to remove signal at times other than during the desired signal pulse. Some embodiments include photonic-crystal cores for the signal and/or photonic-crystal inner cladding for the pump and/or use reflector connector segments. Some embodiments include an inner glass cladding to confine the signal in the core and an outer glass cladding to confine pump light in the inner cladding.

21 Claims, 9 Drawing Sheets

Related U.S. Application Data of application No. 13/160,473, filed on Jun. 14, 2011, now Pat. No. 8,345,348, which is a division of application No. 12/821,975, filed on Jun. 23, 2010, now Pat. No. 8,089,689, which is a division of application No. 11/565,619, filed on Nov. 30, 2006, now Pat. No. 7,768,700.

(51) Int. Cl.
*B29C 47/00* (2006.01)
*B29C 47/70* (2006.01)
*H01S 3/094* (2006.01)
*H01S 3/0941* (2006.01)

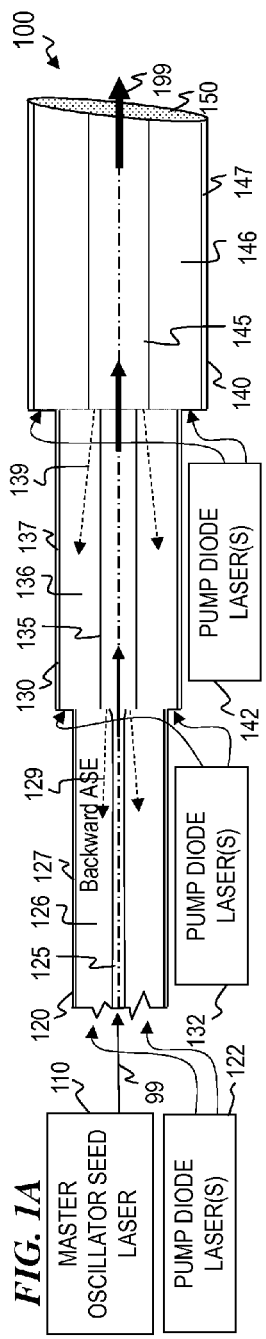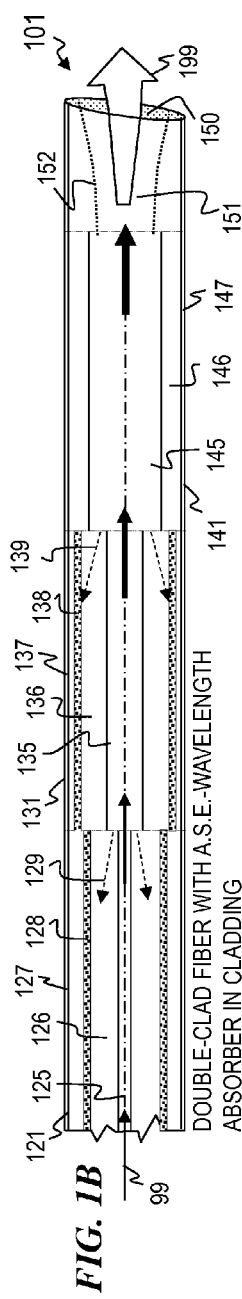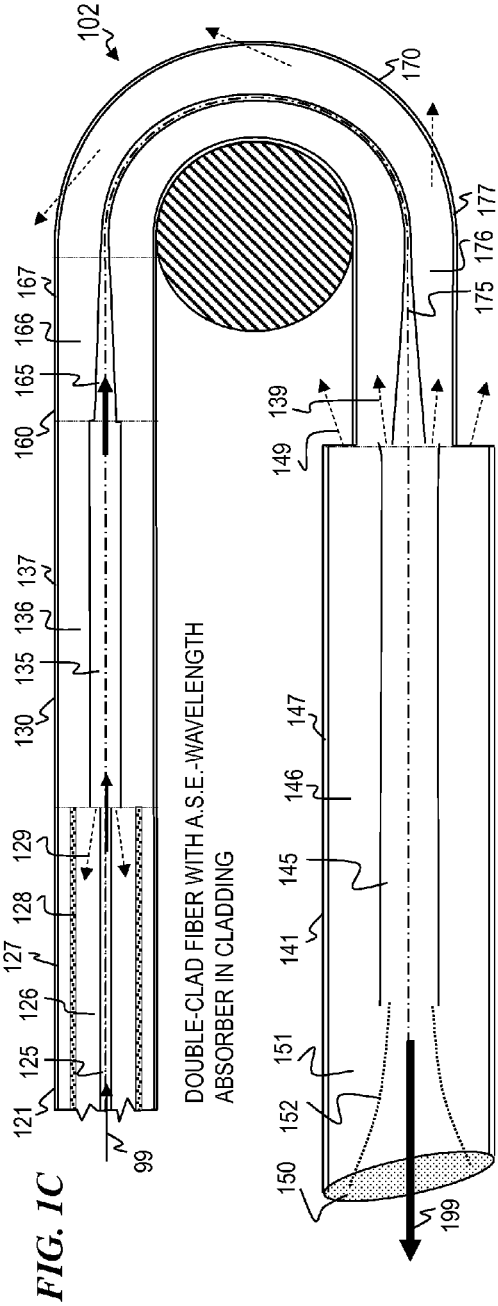

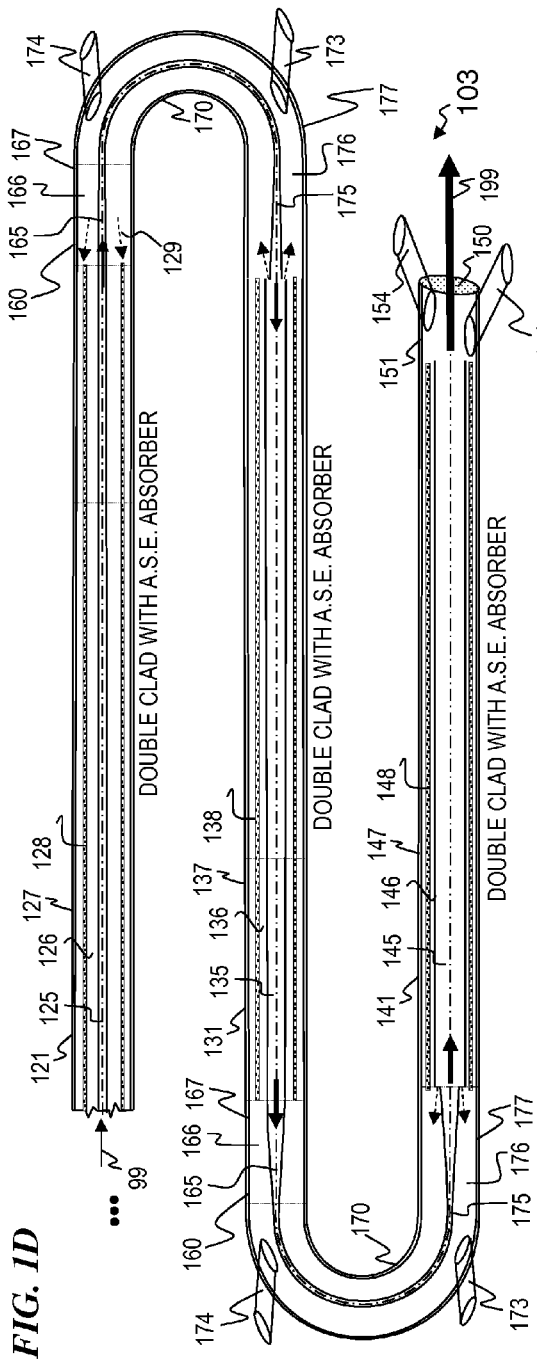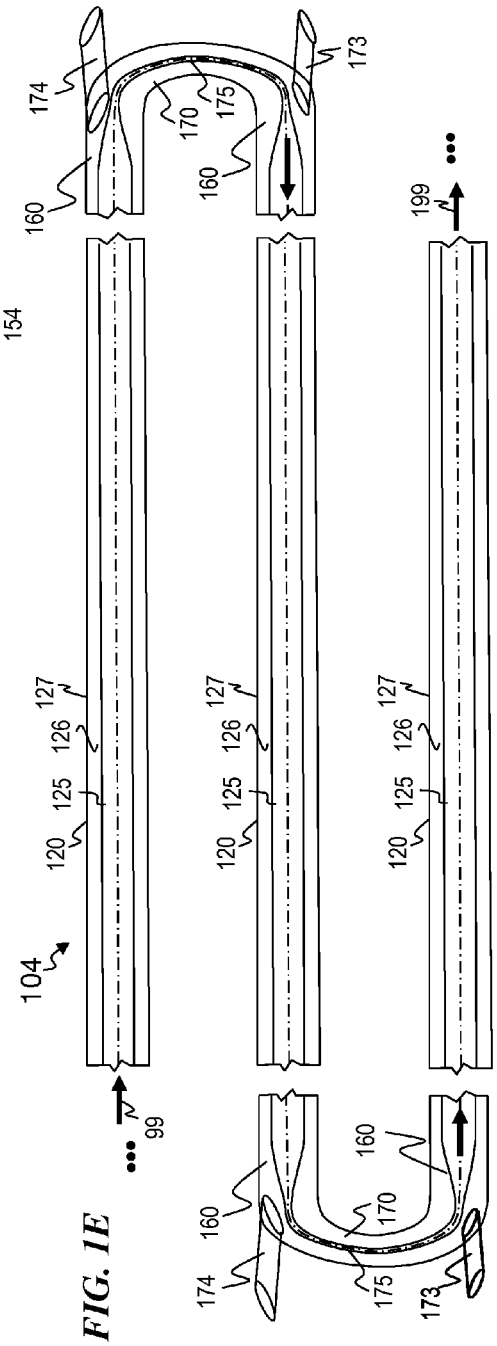

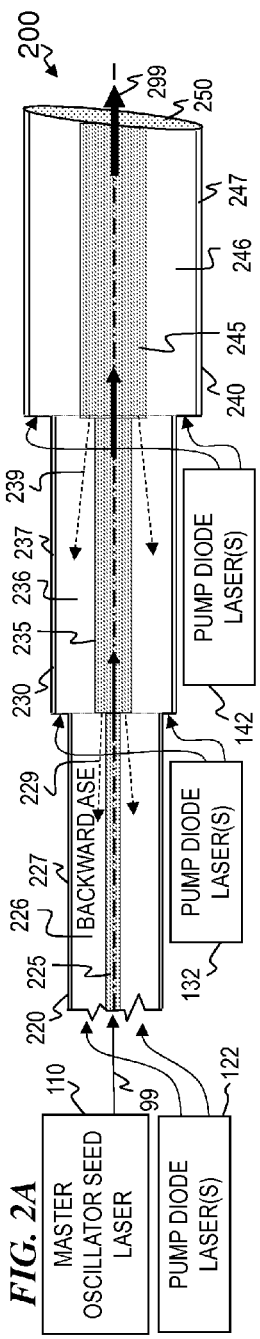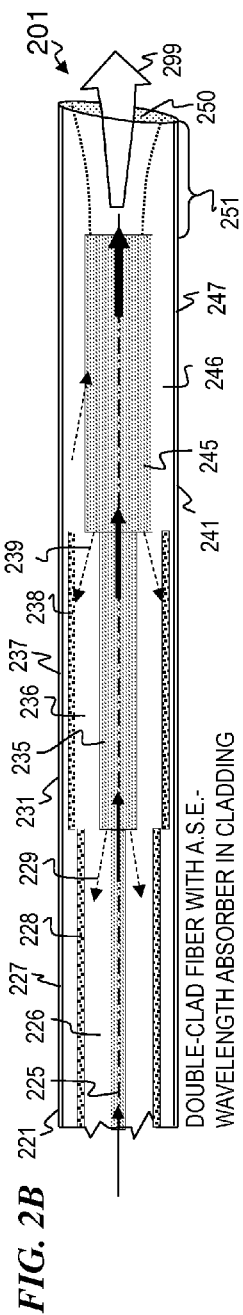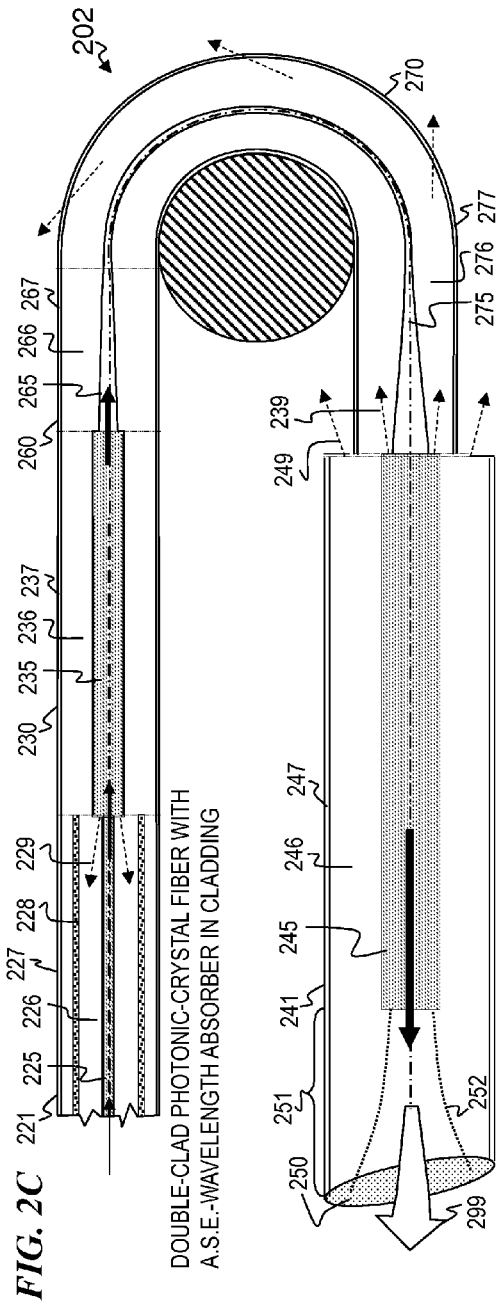

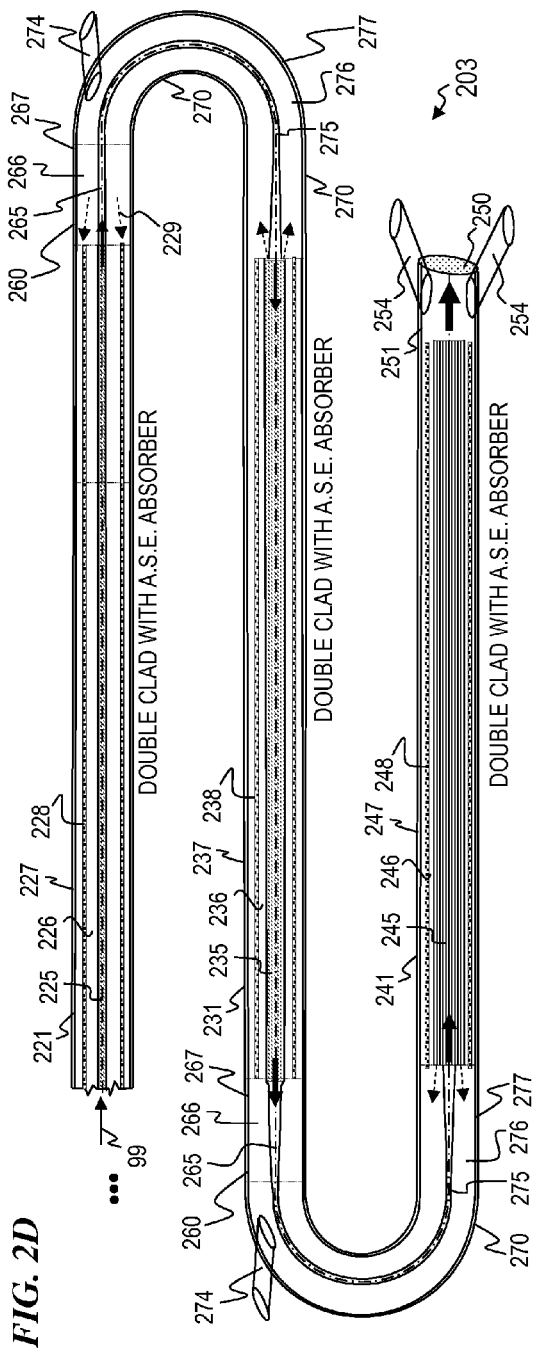
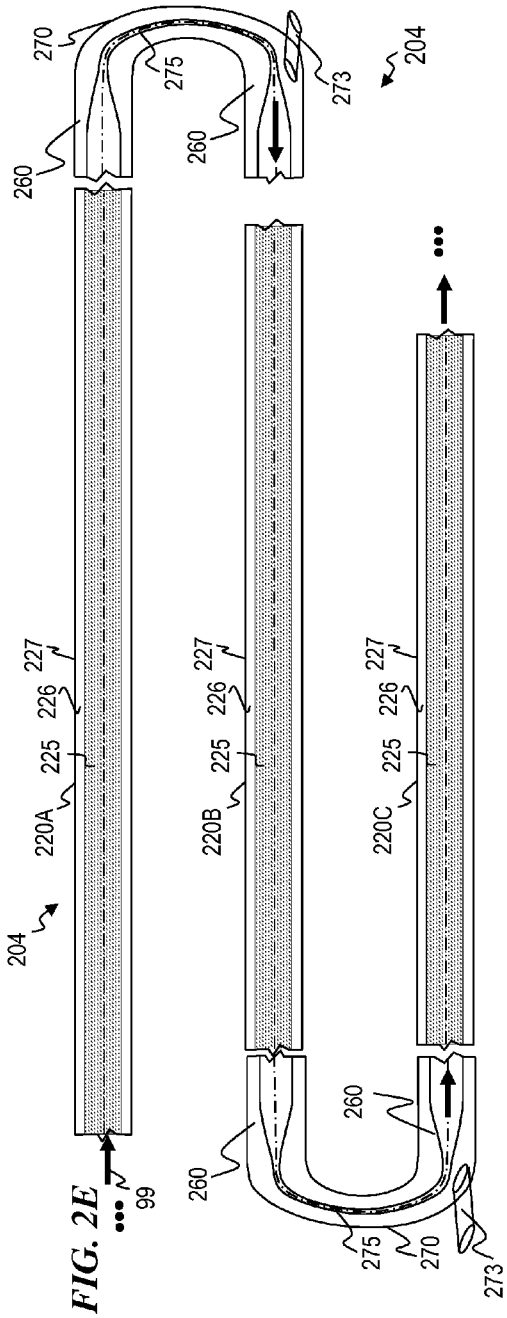
FIG. 2D
FIG. 2E

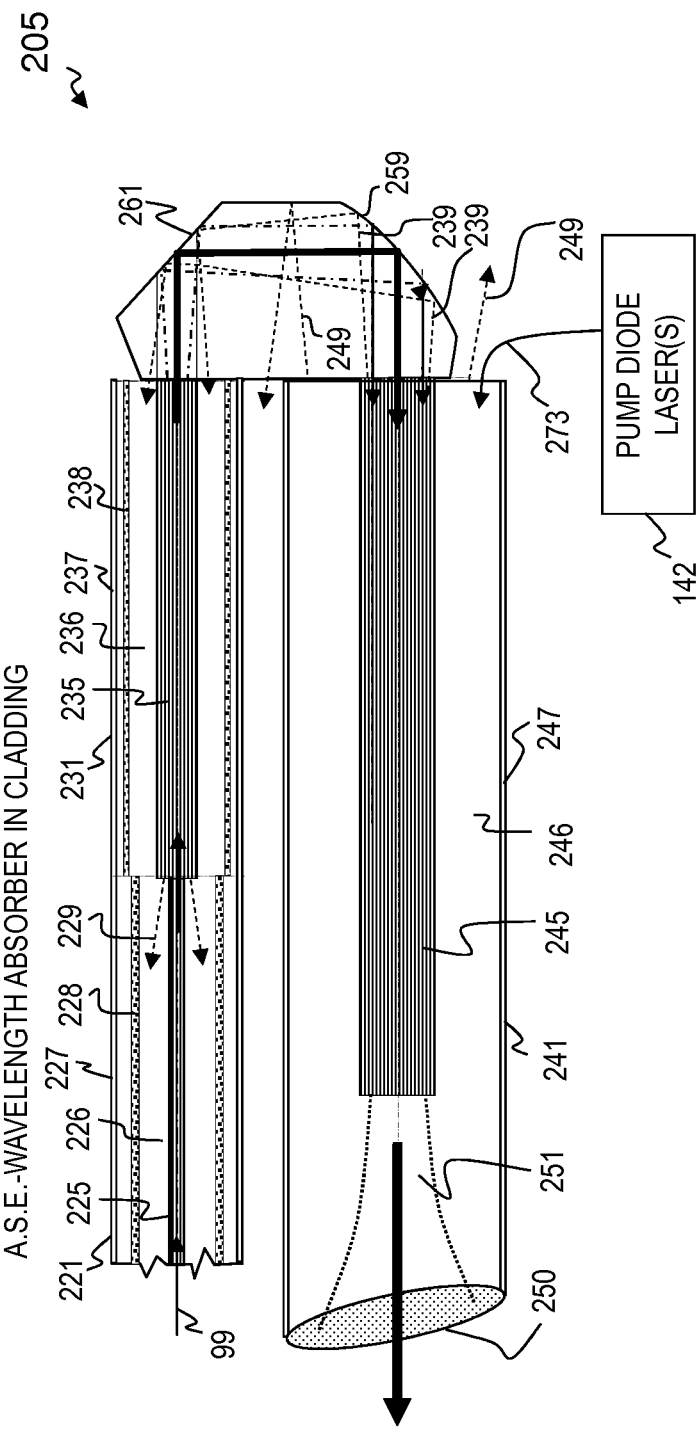
FIG. 2F  DOUBLE-CLAD PHOTONIC-CRYSTAL FIBER WITH A.S.E.-WAVELENGTH ABSORBER IN CLADDING

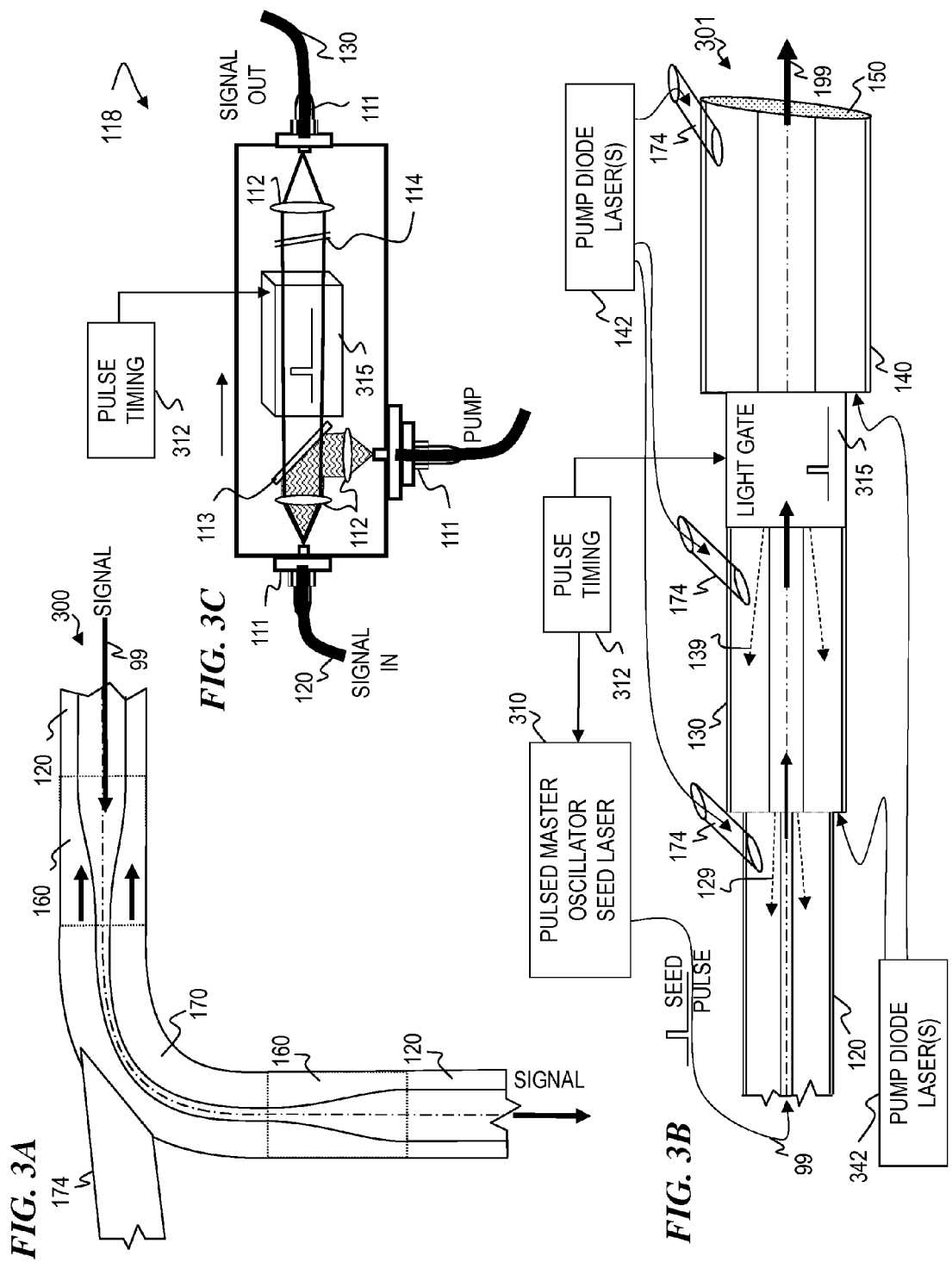

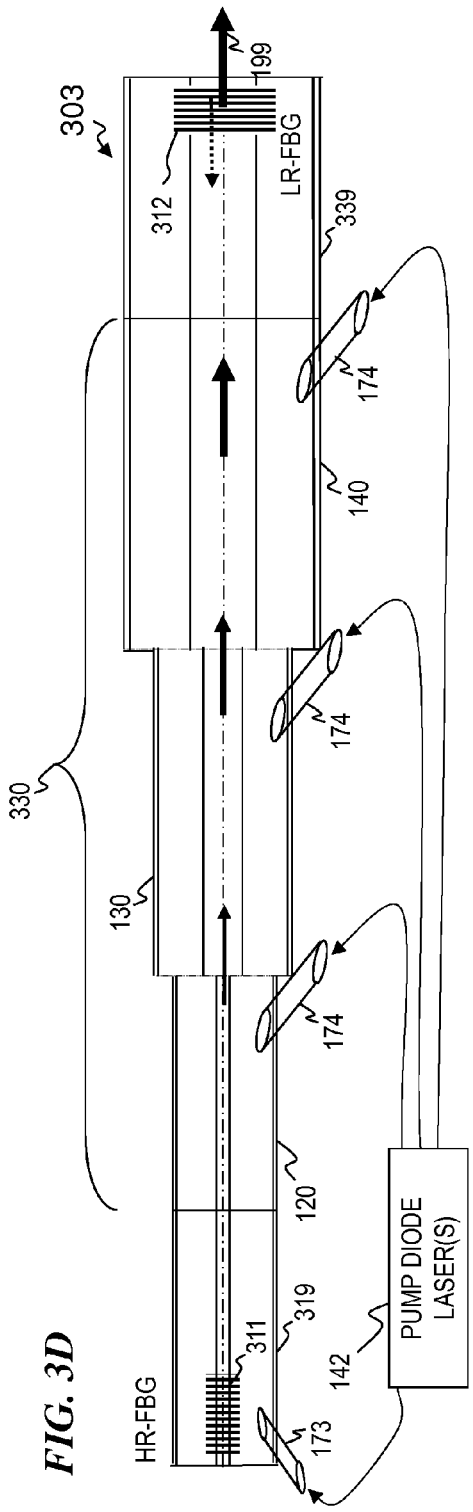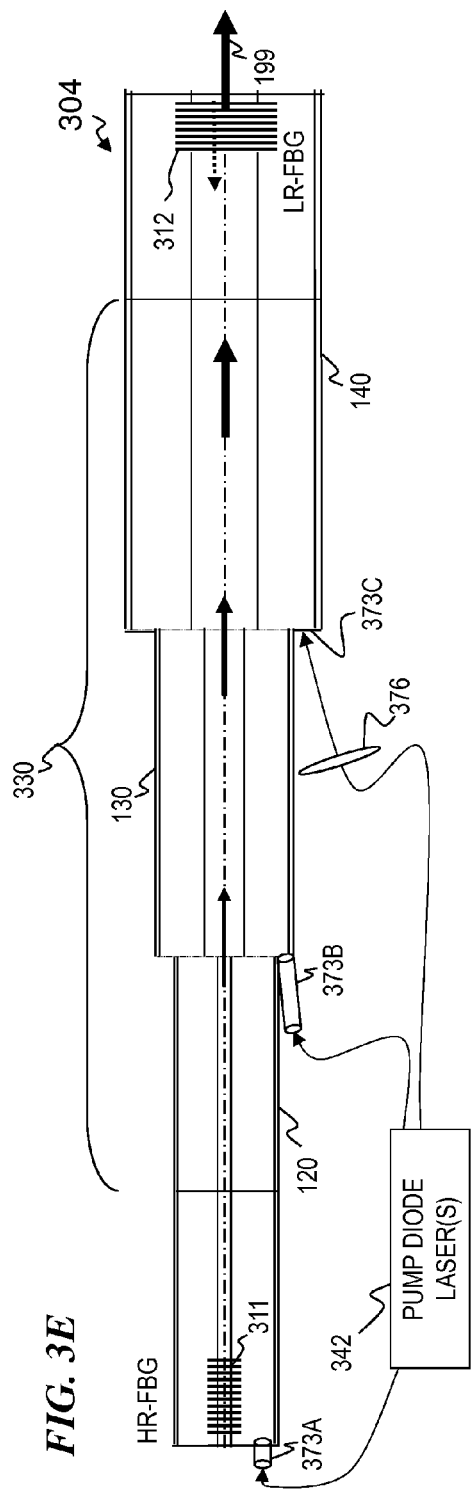

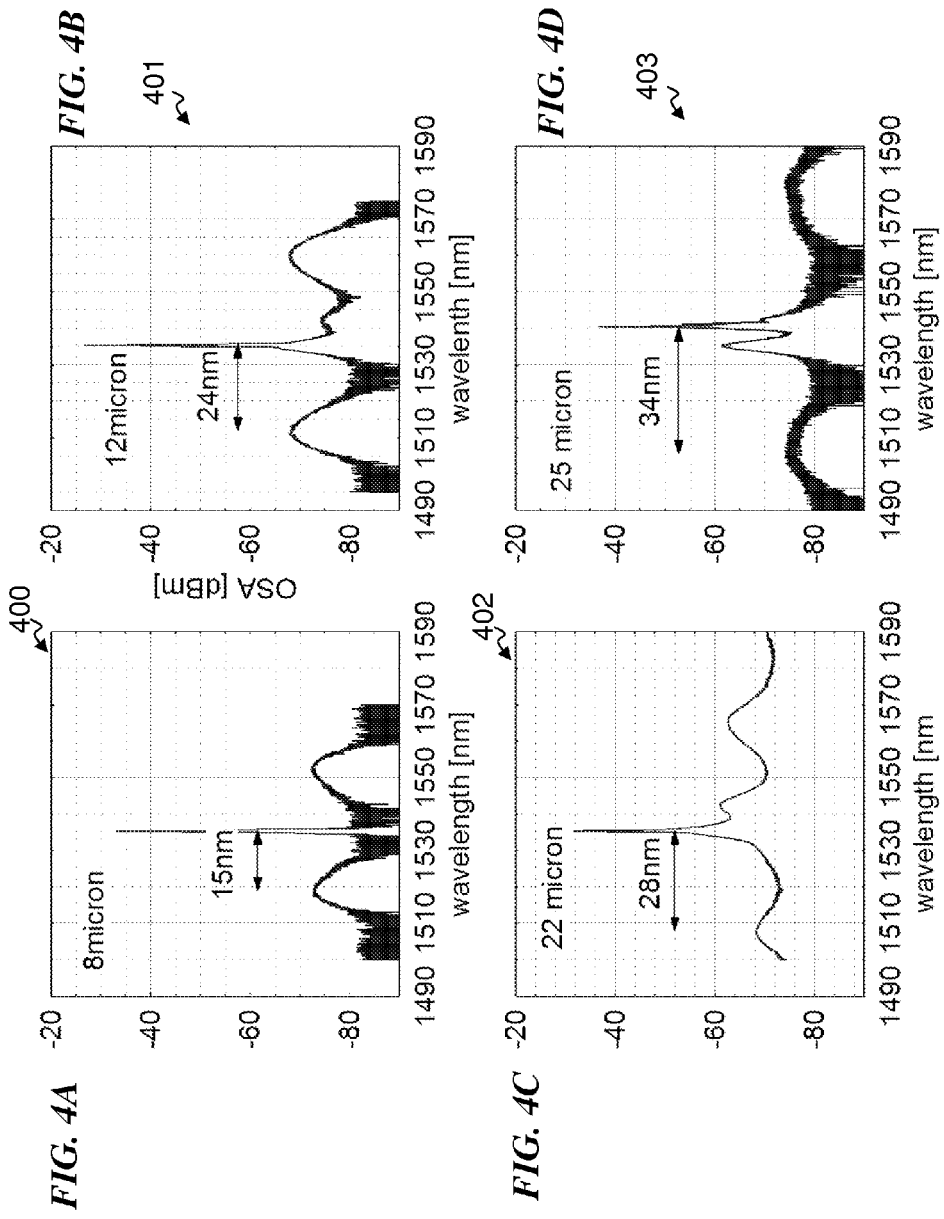

OPTICAL GAIN FIBER HAVING FIBER SEGMENTS WITH DIFFERENT-SIZED CORES AND ASSOCIATED METHOD

CROSS-REFERENCE TO RELATED APPLICATIONS

This is a divisional of and claims benefit of U.S. patent application Ser. No. 13/729,018 filed on Dec. 27, 2012, titled "METHOD AND OPTICAL GAIN FIBER HAVING SEGMENTS OF DIFFERING CORE SIZES" (which issued as U.S. Pat. No. 8,705,166 on Apr. 22, 2014), which is a divisional of U.S. patent application Ser. No. 13/160,473 filed on Jun. 14, 2011, titled "METHOD AND OPTICAL GAIN FIBER HAVING SEGMENTS OF DIFFERING CORE SIZES" (which issued as U.S. Pat. No. 8,345,348 on Jan. 1, 2013), which is a divisional of U.S. patent application Ser. No. 12/821,975 filed Jun. 23, 2010, titled "APPARATUS AND METHOD FOR OPTICAL GAIN FIBER HAVING SEGMENTS OF DIFFERING CORE SIZES" (which issued as U.S. Pat. No. 8,089,689 on Jan. 3, 2012), which is a divisional of U.S. patent application Ser. No. 11/565,619 filed Nov. 30, 2006, titled "METHOD AND APPARATUS FOR OPTICAL GAIN FIBER HAVING SEGMENTS OF DIFFERING CORE SIZES" (which issued as U.S. Pat. No. 7,768,700 on Aug. 3, 2010), each of which is incorporated herein by reference in its entirety.

This invention is also related to
U.S. patent application Ser. No. 11/488,910 filed Jul. 17, 2006 (which issued as U.S. Pat. No. 7,539,231 on May 26, 2009) titled "APPARATUS AND METHOD FOR GENERATING CONTROLLED-LINEWIDTH LASER-SEED-SIGNALS FOR HIGH-POWERED FIBER-LASER AMPLIFIER SYSTEMS,"
U.S. patent application Ser. No. 11/426,302 filed Jun. 23, 2006 (which issued as U.S. Pat. No. 7,526,167 on Apr. 28, 2009) titled "APPARATUS AND METHOD FOR A HIGH-GAIN DOUBLE-CLAD AMPLIFIER,"
U.S. patent application Ser. No. 11/420,730 filed May 26, 2006 (which issued as U.S. Pat. No. 7,430,352 on Sep. 30, 2008) titled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD,"
U.S. patent application Ser. No. 11/420,732 filed May 27, 2006 (which issued as U.S. Pat. No. 7,440,175 on Oct. 21, 2008) titled "MULTI-STAGE OPTICAL AMPLIFIER HAVING PHOTONIC-CRYSTAL WAVEGUIDES FOR GENERATION OF HIGH-POWER PULSED RADIATION AND ASSOCIATED METHOD,"
U.S. patent application Ser. No. 11/420,755 filed May 28, 2006 (which issued as U.S. Pat. No. 7,436,585 on Oct. 14, 2008) titled "CHIRPED-PULSE AMPLIFIER USING PHOTONIC-CRYSTAL-ROD (PCR) WAVEGUIDES AND ASSOCIATED METHOD,"
U.S. patent application Ser. No. 11/420,756 filed May 28, 2006 (which issued as U.S. Pat. No. 7,386,211 on Jun. 10, 2008) titled "METHOD AND APPARATUS FOR SPECTRAL-BEAM COMBINING OF MEGAWATT-PEAK-POWER BEAMS FROM PHOTONIC-CRYSTAL RODS," and
U.S. patent application Ser. No. 13/160,458 filed on Jun. 14, 2011, titled "OPTICAL GAIN FIBER HAVING SEGMENTS OF DIFFERING CORE SIZES AND ASSOCIATED METHOD" (which issued as U.S. Pat. No. 8,199,399 on Jun. 12, 2012), which are all hereby incorporated herein by reference.

STATEMENT REGARDING FEDERALLY SPONSORED RESEARCH OR DEVELOPMENT

This invention was made with Government support under contract F29601-98-D-0190 awarded by the U.S. Navy. The Government has certain rights in the invention.

FIELD OF THE INVENTION

The invention relates generally to high-power optical fiber amplifiers and lasers and more particularly to methods and apparatus for forming an amplifier or laser using a plurality of spliced-together fiber segments with different-sized cores.

BACKGROUND OF THE INVENTION

The broad gain bandwidth of conventional fiber-laser systems allows for operation over a wide range of wavelengths, or even tunable operation. For the simplest fiber laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

It is desirable to produce high peak and average powers from fiber lasers and amplifiers. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth-doped (RE-doped) fiber with a large core. The large core provides two benefits: Spreading the light over a larger core cross-section area decreases the intensity that drives the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system.

Stimulated Brillouin Scattering (SBS) is a well-known phenomenon that can lead to power limitations or even the destruction of a high-power fiber-laser system due to sporadic or unstable feedback, pulse compression and/or signal amplification.

Even when a fiber amplifier or fiber laser is designed to compensate for the above effects, there will be a limit on the maximum power that can be obtained from a single fiber when scaling to larger fiber sizes and/or lengths, pump powers, and the like.

There is a need for improved laser systems, particularly fiber lasers and fiber optical amplifiers having improved amplification characteristics and/or a mode filter for undesired light such as backward-traveling amplified spontaneous emission (ASE).

BRIEF SUMMARY OF THE INVENTION

In some embodiments, the invention provides methods and apparatus for enhanced energy extraction from an optical fiber amplifier by removing ASE light from the amplifier at locations along the fiber to reduce the amount of pump power used to amplify the ASE and thus increase the amount of pump power available to amplify the signal light. In some embodiments, subsequent sections of fiber have larger diameters, and/or have cores that have larger diameters, than prior sections of fiber, and are spliced together in such a way as to divert ASE out of the core and/or out of the fiber at the splice location. Further, by providing different core sizes for each of a plurality of fiber sections, the wavelength spacings of the four-wave-mixing lobes are different for each such section of fiber, which results in a reduced amount of four-wave mixing and an increased beam quality and narrower beam-wavelength linewidth.

In some embodiments, the present invention uses a plurality of fiber sections, each section having a different core size, wherein the beginning section(s) of fiber (those encountered by the signal earlier) have a smaller core size than later section(s) of fiber. In some embodiments, pump light (e.g., from one or more suitable semiconductor lasers) is launched into a fiber section in a co-propagating direction at a splice location between two sections of fiber, in order to reduce signal coupling into the pump lasers (reducing the possibility of damage to the pump lasers). The segments are used for amplifying laser signals using segments of fibers of differing core diameters and/or differing cladding diameters to suppress amplified spontaneous emission (ASE) and non-linear effects such as four-wave mixing (FWM), self-phase modulation (SPM), and stimulated Brillouin and/or Raman scattering (SBS and SRS). In some embodiments, different core sizes have different sideband spacings (spacing between the desired signal and wavelength-shifted lobes). Changing core sizes and phase mismatches prevent buildup of non-linear effects and/or effectively filter undesired modes. Some embodiments further include a wavelength bandpass filter to remove signal other than the desired signal wavelength and/or a time gate to remove signal at times other than in the desired signal pulse. Some embodiments include photonic-crystal structures to define the core for the signal and/or the inner cladding for the pump. Some embodiments include an inner glass cladding to confine the signal in the core and an outer glass cladding to confine pump light in the inner cladding.

It is specifically contemplated that some embodiments of the invention include supersets and/or subsets of the embodiments and combinations described herein. It also is specifically contemplated that some embodiments of the invention include supersets and/or subsets of the embodiments and combinations described herein combined with one or more embodiments of the related applications recited herein, including U.S. patent application Ser. No. 11/488, 910 (now U.S. Pat. No. 7,539,231), Ser. No. 11/426,302 (now U.S. Pat. No. 7,526,167), Ser. No. 11/420,730 (now U.S. Pat. No. 7,430,352), Ser. No. 11/420,732 (now U.S. Pat. No. 7,440,175), Ser. No. 11/420,755 (now U.S. Pat. No. 7,436,585), and Ser. No. 11/420,756 (now U.S. Pat. No. 7,386,211), which are all hereby incorporated herein by reference.

BRIEF DESCRIPTION OF THE DRAWINGS

FIG. 1A is a schematic plan view (not to scale) of a MOPA system 100 with a plurality of fiber segments having different core sizes connected as a power amplifier.

FIG. 1B is a schematic plan view (not to scale) of an amplifier system 101 with a plurality of fiber segments having different core sizes, some having ASE-absorbent cladding regions.

FIG. 1C is a schematic plan view (not to scale) of an amplifier system 102 with a plurality of fiber segments having different core sizes, some having ASE-absorbent cladding regions, and a high-NA connector segment.

FIG. 1D is a schematic plan view (not to scale) of an amplifier system 103 with a plurality of fiber segments having different core sizes and having ASE-absorbent cladding regions, and two high-NA connector segments having pump injection ports.

FIG. 1E is a schematic plan view (not to scale) of an amplifier system 104 with a plurality of amplifying fiber segments having similar core sizes and two high-NA tapered connector segments having pump injection ports.

FIG. 2A is a schematic plan view (not to scale) of a MOPA photonic-crystal fiber system 200 with a plurality of fiber segments having different core sizes connected as a power amplifier.

FIG. 2B is a schematic plan view (not to scale) of a photonic-crystal fiber amplifier system 201 with a plurality of fiber segments having different core sizes, some having ASE-absorbent cladding regions.

FIG. 2C is a schematic plan view (not to scale) of a photonic-crystal fiber amplifier system 202 with a plurality of fiber segments having different core sizes, some having ASE-absorbent cladding regions, and a high-NA connector segment.

FIG. 2D is a schematic plan view (not to scale) of a photonic-crystal fiber amplifier system 203 with a plurality of fiber segments having different core sizes and having ASE-absorbent cladding regions, and two high-NA connector segments having pump injection ports.

FIG. 2E is a schematic plan view (not to scale) of a photonic-crystal fiber amplifier system 204 with a plurality of amplifying fiber segments having similar core sizes but optionally different segment lengths, and having two high-NA tapered connector segments having pump injection ports.

FIG. 2F is a schematic plan view (not to scale) of a photonic-crystal fiber amplifier system 205 with a plurality of amplifying fiber segments having different core sizes and having ASE-absorbent cladding regions, and a prism or other reflective connector segment.

FIG. 3A is a schematic plan view (not to scale) of an amplifier system 300 with a plurality of amplifying fiber segments having similar core sizes and a high-NA tapered connector segment having a pump injection port.

FIG. 3B is a schematic plan view (not to scale) of an amplifier system 301 with a plurality of fiber segments having different core sizes, and including a synchronized light gate between at least some of the segments.

FIG. 3C is a schematic plan block diagram (not to scale) of an light gate subsystem 118 for use with a plurality of fiber segments having different core sizes to provide a synchronized light gate between two of the segments.

FIG. 3D is a schematic plan view (not to scale) of an amplifier system 303 with a plurality of fiber segments having different core sizes, a plurality of pump ports, and a fiber Bragg grating at each end.

FIG. 3E is a schematic plan view (not to scale) of an amplifier system 304 with a plurality of fiber segments having different core sizes, co-propagating pump ports, an open-air pump port, and a fiber Bragg grating at each end.

FIG. 4A is a graph 400 of power vs. wavelength of an amplifier system using an 8-micron fiber.

FIG. 4B is a graph 401 of power vs. wavelength of an amplifier system using a 12-micron fiber.

FIG. 4C is a graph 402 of power vs. wavelength of an amplifier system using a 22-micron fiber.

FIG. 4D is a graph 403 of power vs. wavelength of an amplifier system using a 25-micron fiber.

DETAILED DESCRIPTION OF THE INVENTION

Figure 5B:
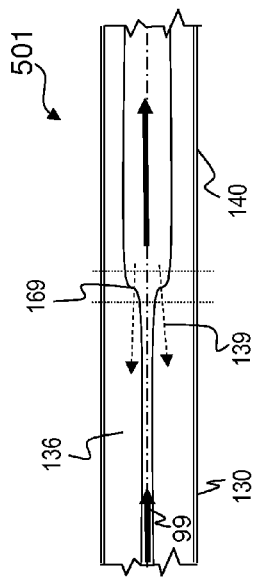
FIG. 5B is a schematic plan view (not to scale) of an amplifier system 501.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Stimulated Brillouin Scattering (SBS) can lead to power limitations or even the destruction of a high-power fiber-laser system due to sporadic or unstable feedback, self-lasing, pulse compression and/or signal amplification.

One way to generate output with more controlled attributes is to use a master-oscillator power-amplifier (MOPA) architecture. In some embodiments, the low-power oscillator is optimized to generate a laser seed signal having the appropriate characteristics, such as controlled linewidth and wavelength, and the seed signal is input to that power amplifier, which is used to increase the output power and/or pulse energy to much higher levels.

Recent advances in high-power fiber lasers have shown that fiber lasers are one of the most efficient solid-state lasers that have the capability to generate kW-order output power with very good beam quality. The process to scale up the output power of a single-fiber laser to a higher power level faces significant challenges since nonlinear effects, thermal loading, fiber damage, as well as the required pump power and brightness of pump laser diodes (LDs) will limit the maximum output power. Several approaches have been demonstrated to scale up output power by combining multiple lasers. Multi-core phase-locked fiber lasers that use the evanescent coupling between multiple cores of a fiber to achieve coherent combining significantly reduce nonlinear processes within the fiber core. The laser configuration is simple and robust, but the maximum power is still limited by available pump power and brightness of LDs as is the case in the single-fiber system. Coherent beam combining of multiple fiber lasers using the master-oscillator power-amplifier (MOPA) configuration solves the power limitation, but the system is very complicated and must solve phase-control, optical-alignment and stability issues.

In some embodiments, the present invention uses a plurality of doped amplifier fiber segments (e.g., fused end-to-end), wherein a segment later in the amplification path has a core size (i.e., diameter) larger than its previous segment. In some embodiments, the overall fiber diameter for the later segment is larger than the overall fiber diameter for its previous segment. In some embodiments, this arrangement allows the pump light to be co-propagating with the signal light (i.e., both traveling in the same direction) while simultaneously tailoring the inversion profile (the amount of pump light energy that has been absorbed and is ready to be used for amplification) such that the highest energy is located where the signal strength is greatest. By having the pump light co-propagating with the signal, the risk of having high-power signal light leak into the pump laser is reduced, reducing the danger of damaging the pump.

Some embodiments of the present invention provide a beam quality factor $M^2$ of less than about 3, less than about 2.75, less than about 2.5, less than about 2.25, less than about 2, less than about 1.75, less than about 1.5, less than about 1.25, less than about 1.2, less than about 1.15, less than about 1.1, less than about 1.05, or even less than about 1.01. Some embodiments of the present invention provide an average output beam power of about 10 watts (W) or greater, about 20 watts (W) or greater, about 30 watts (W) or greater, about 40 watts (W) or greater, about 50 watts (W) or greater, about 60 watts (W) or greater, about 70 watts (W) or greater, about 80 watts (W) or greater, about 90 watts (W) or greater, about 100 watts (W) or greater, about 200 watts (W) or greater, about 300 watts (W) or greater, about 400 watts (W) or greater, about 500 watts (W) or greater, about 600 watts (W) or greater, about 700 watts (W) or greater, about 700 watts (W) or greater, about 900 watts (W) or greater, or even about 1 kilowatt (kW) or greater. Some embodiments of the present invention provide a peak output beam power of about 1 kilowatt (kW) or greater, about 5 kW or greater, about 10 kW or greater, about 50 kW or greater, about 100 kW or greater, about 200 kW or greater, about 300 kW or greater, about 400 kW or greater, about 500 kW or greater, about 600 kW or greater, about 700 kW or greater, about 800 kW or greater, about 900 kW or greater, about 1 megawatt (MW) or greater, or even about 2 MW or greater. Some embodiments of the invention include one of the above quality characteristics simultaneously combined with one of the above average power characteristics and/or one of the above peak power characteristics.

Further, the present invention is not limited to a particular signal wavelength or pump wavelength, and each of these wavelengths can be selected or used by utilizing a suitable dopant, such as any suitable one or more rare-earth dopants, as are well known in the art. Some embodiments select a particular signal wavelength, and then use one pump wavelength in one or more of the segments, and a different pump wavelength in other segments, or use two or more different pump wavelengths in one segment.

A flared fiber amplifier is described by Okhotnikov et al. in "Flared single-transverse-mode fibre amplifier," Electronics Letters, Vol. 35, No. 12, 10$^{th}$ Jun. 1999, which is hereby incorporated by reference. They describe a segmented structure to couple input radiation into a large area fundamental mode of a multimode active fiber. A sequence of spliced active fibers with successively increased core diameters (e.g., 5, 12, and 23 microns) is used to enable improved mode matching into a multimode fiber with a uniform cladding diameter (e.g., 125 microns) over the total amplifier length. The configuration described by Okhotnikov et al. did not address the non-linear effects, nor the backward-traveling ASE problems that are addressed by the present invention.

FIG. 1A is a schematic plan view (not to scale) of a MOPA system 100 with a plurality of fiber segments having different core sizes connected as a power amplifier. In some embodiments, a master-oscillator seed laser 110 provides a high-quality and relatively low-power laser signal 99 that is launched into the core 125 of a first fiber segment 120. In some embodiments, this seed signal is continuous wave (CW). In other embodiments, this seed signal is pulsed; in some such embodiments, the pulses are kept short enough (e.g., about 5 ns or shorter, or about 4 ns or shorter, or about 3 ns or shorter, or 2 ns or shorter in some embodiments) to prevent SBS buildup. In some embodiments, the pulse is made short enough to be equal or shorter than the dephasing time of the acoustic vibrations in the particular material in the gain medium (e.g., the amplifying fiber), to prevent the buildup of SBS. In some embodiments, first optical fiber segment 120 includes a core 125 (used to carry the optical signal), surrounded by an inner cladding 126 (used to carry the optical pump light and inject it into core 125 over a length of the core), which is in turn surrounded by an outer cladding 127 (used to contain the optical pump light over its length). In some embodiments, the pump laser source 122 is coupled to inject its pump light into segment 120 in a direction co-propagating with the seed signal, thus reducing the danger that signal or pump light traveling backward could enter and damage the pump laser source 122. Similarly, second optical fiber segment 130 includes a core 135 (having a larger mode area than core 125, and used to carry the optical signal), surrounded by an inner cladding 136 (again, used to carry the optical pump light from pump source 132 in a co-propagating direction and inject it into core 135 over a length of the core). Inner cladding 136 is in turn surrounded by an outer cladding 137 (used to contain the optical pump light over its length). Third optical fiber segment 140 includes a core 145 (having a larger mode area than core 135 used to carry the optical signal), surrounded by an inner cladding 146 (again, used to carry the optical pump light from pump source 142 in a co-propagating direction and inject it into core 145 over a length). Inner cladding 146 is in turn surrounded by an outer cladding 147 (used to contain the optical pump light over a length). In some embodiments, one or more pump diode lasers 122 generate laser light of a pump wavelength (e.g., a wavelength shorter than the signal wavelength, in some embodiments) that is launched into an inner cladding 126 of first fiber segment 120, where it will leak into core 125 over its length, providing optical pump power used to amplify the signal wavelength in the first fiber segment 120. Similarly, one or more pump diode lasers 132 generate laser light of a pump wavelength that is launched into inner cladding 136 of second fiber segment 130, where it will leak into core 135 over its length, providing optical pump power used to amplify the signal wavelength in the second fiber segment 130. One or more pump diode lasers 142 generate laser light of a pump wavelength that is launched into inner cladding 146 of third fiber segment 140, where it will leak into core 145 over its length, providing optical pump power used to amplify the signal wavelength in third fiber segment 140. In some embodiments, each of the pump-light sources injects its light in a co-propagating direction. In some embodiments, an end facet 150 is cleaved or polished onto the end of segment 140, wherein facet 150 is angled and/or coated to reduce internal reflection of output beam 199.

In some embodiments (e.g., certain embodiments having short fiber segments), it is convenient to have the pump light propagating in the same direction in the fiber as the signal (i.e., where pump and signal are "co-propagating"), as shown in FIG. 1A. This also reduces the risk of light traveling backward into the pump source and damaging it. In some embodiments, the amount of energy in the pump light is increased for each subsequent segment, and each high-power segment is kept relatively short, in order to reduce the interaction length of high-power signal with the fiber, thus reducing non-linear effects such as four-wave mixing (FWM).

In other embodiments, (some of which are described more below, e.g., for longer fiber lengths and higher optical power), it is preferable to have the pump light propagating in the opposite direction in the fiber as the signal (i.e., where pump and signal are "counter-propagating"), since that also reduces the interaction lengths of undesirable non-linear processes at the highest powers, and it delivers higher pump power to the signal at points where the signal most needs higher power.

In the embodiment shown in FIG. 1A, each successive fiber segment in the direction of increasing power (i.e., towards the right) has a core size and mode area that is larger than the previous core, and these segments are fused together (e.g., by melting) in a manner that purposely does not substantially taper the core size at the joint.

In some embodiments of every example shown herein, the sizes of the cores on both sides of the joint are slightly increased by diffusion of doping species while the joint is heated to be fused, but since both cores increase, there is still a discontinuity, with the core of the fiber segment in the direction of increasing power being larger than the previous segment's core.

This discontinuity permits a relatively efficient propagation of signal light towards the right (into the larger core and towards higher levels of amplification and signal output), while making relatively inefficient (e.g., by modal filtering (selectively removing part or all of certain modes of the fiber)) the backward propagation of undesirable ASE (e.g., particularly the higher-order ASE modes) towards the left (into the smaller core and towards the seed laser 110). That is, backward propagating light goes from a larger core to a smaller core without a taper, and thus at least some of that backward propagating light leaks into the cladding (e.g., along the dotted arrows 129 and 139), where it causes less problems (e.g., depletion of pump power and interaction with the seed signal source 110 or pump sources 122 and 132) than if the backward propagating light were all in the core. Further, in the embodiment shown in FIG. 1A, each successive fiber segment has an outer diameter of the entire fiber that is larger than the previous segment's outer diameter, again wherein the two segments are fused together in a manner that purposely does not substantially taper the joint (or, if tapering is done, the taper is not continuous), in order that backward-traveling light at least partially leaks into the cladding. In some embodiments, the change in core size also reduces phase matching between segments, which also reduces the efficiency of energy transfer into the non-linear processes, thus preserving more energy for use in amplifying the desired signal light.

In some embodiments, the outer cladding diameters are different between at least one of the pairs of segments. In some embodiments, the downstream segment (e.g., segment 130 relative to segment 120) has the larger diameter, exposing its inner cladding and allowing pump light (e.g., from pump diode lasers 132) to be injected into the inner cladding (e.g., 136) of downstream segment in a co-propagating direction (i.e., in the same direction as the signal in the core).

In other embodiments, the outer diameters of at least two of the segments are the same dimension, for example, as shown in FIG. 1B.

In some embodiments of system 100 of FIG. 1A, the inner cladding (e.g., 136) of at least one of the segments includes a signal-wavelength-absorbing region (e.g., 138, as shown in FIG. 1B).

FIG. 1B is a schematic plan view (not to scale) of an amplifier system 101 with a plurality of fiber segments having different core sizes. In some embodiments, at least some of the segments have ASE-absorbent cladding regions. Segment 121 is similar to segment 120, but with the addition of a ring 128 (or other signal-absorbing structure) in the inner cladding, which is doped with a dopant that selectively absorbs light of the signal wavelength (e.g., backwards-traveling ASE 129 that propagated into the inner cladding 126 from a successive core 135 or 145), while substantially not absorbing light of the pump wavelength. Similarly, segment 131 is similar to segment 130, but with the addition of a signal-absorbing ring 138 or other structure in the inner cladding that is doped with a dopant that selectively absorbs light of the signal wavelength (e.g., backwards-traveling ASE 139 that propagated into the inner cladding 136 from a successive core 145), while substantially not absorbing light of the pump wavelength. In some embodiments, outer diameters of at least two of the segments are the same dimension (e.g., the outer diameter of segment 121 equals the outer diameter of segment 131, which also equals the outer diameter of segment 141). In some embodiments, one or more segments (e.g., segment 141) do not have an absorbing structure equivalent to absorbing structure 138 or 128. In some embodiments, an endcap 151 is fused to the end of segment 141, where endcap 151 has no defined core (i.e., the index of refraction is not raised in the middle of endcap 151), thus allowing at least some divergence 152 (due to the lack of a defined core) on the output beam 199 before that beam encounters end facet 150. This spreading of the output beam 199 within the endcap 151 lowers the intensity or power per unit area of light through the facet 150, thus reducing possible damage to the facet 150 due to the high power of the output beam 199. In some embodiments, this endcap feature is included in other embodiments, such as, for example, that shown in FIG. 1A. The coupling mechanism for getting pump light into the inner cladding and/or core of some embodiments (such as FIG. 1B) is not shown, but any suitable coupling (such as fusing a pigtail (e.g., 173 or 174 of FIG. 1D) to a side of one or more of the segments) will work.

FIG. 1C is a schematic plan view (not to scale) of an amplifier system 102 with a plurality of amplifying fiber segments (e.g., 121, 130, and 141) having different core sizes, some having ASE-absorbent cladding regions (e.g., region 128 in segment 121), and having a high-NA connector segment 170 that is capable of being positioned to a suitable bend radius without incurring substantial signal loss from the core. In some embodiments, system 102 includes a first amplifying segment 121 (having core 125, inner cladding 126, absorbing ring 128, and outer cladding 127), which is fused to second amplifying segment 130 (having core 135, inner cladding 136, and outer cladding 137), which is fused to tapered-core segment 160 (having a core 165 that tapers to a smaller diameter in the direction of signal travel, inner cladding 166 and outer cladding 167), which is fused to (or an end portion of) low-bend-loss segment 170 (having a high-NA core 175 that reduces bend losses of signal light, inner cladding 176, and outer cladding 177), which is fused to final amplifying segment 141 (having core 145, inner cladding 146, and outer cladding 147), which is fused to endcap segment 151 (which allows a dispersion or divergence 152 of output beam 199). As shown in FIG. 1C and FIG. 1D, in some embodiments, segment 170 also includes a taper from a smaller diameter to a larger diameter, wherein the larger diameter is at the junction with final amplifying segment 141.

Note that in some embodiments, tapered core 165 at its signal input end, has a smaller diameter than photonic crystal segment core 135, but the desired mode of the signal in segment core 135 is concentrated towards its center portion typically, and the taper is adjusted to match that mode so there is little loss of the signal at the fusion joint between segment core 135 and segment core 165. In some embodiments, segment core 165 is fabricated with a radial doping profile designed to romote propagation of the desired mode (e.g., a certain mode such as LP01 (linear-polarization-01), or LP02, or other desired higher-order mode). In some embodiments, for single-mode fibers, the tapers are adjusted so the cores are substantially equal diameters at the joint. For multi-moded fibers, the joints have a discontinuity that provides for at least a portion of undesired higher-order-mode energy to leak out at the joint, thus providing a higher-quality output signal.

In some embodiments, the higher-order modes of any ASE or other backward-traveling light 129 generated in core 135 or subsequent cores at least partially leaks into inner cladding 126 where it is at least partially absorbed by absorbing ring 128, thus reducing problems that could be caused by such backward-traveling light. Any ASE or other backward-traveling light 139 generated in core 145 at least partially leaks into inner cladding 176 where it is at least partially lost through outer cladding 177 by bending loss, or is later absorbed by absorbing ring or cylinder 128, thus reducing problems (e.g., damage to the pump or seed sources, or loss of pump energy that would go into amplifying such ASE signals) that could be caused by such backward-traveling light. In some embodiments, at least some backward traveling light 149 (e.g., perhaps a portion of signal light that may be reflected by facet 150) leaks out of inner cladding 146 into the external environment, thus reducing problems that could be caused by such backward-traveling light.

FIG. 1D is a schematic plan view (not to scale) of an amplifier system 103 with a plurality of amplifying fiber segments (121, 131, and 141) having different core sizes (in some embodiments, such as shown here, the outer fiber diameters are substantially the same, while in other embodiments, the outer diameters (including the inner and outer cladding regions) increase in size as the core diameters increase in size) and having ASE-absorbent cladding regions (128, 138, and 148), and two high-NA-core connector segments 170 each optionally having one or more co-propagating pump-injection ports 173 and/or optionally having one or more counter-propagating pump-injection ports 174.

In some embodiments, the counter-propagating pump-injection ports 174 are omitted to protect the pump sources, since such pigtail fusion splices are typically somewhat lossy, and high-power signal leaking into the pump source can damage the pump source. In other embodiments, other protection methods are used to protect the pump source, such as dichroic filters that block the signal wavelength, or fiber that has doping that absorbs the signal wavelength but passes the pump wavelength.

In some embodiments, an endcap 151 is fused to the final amplifier segment 141, and serves to disperse the output beam power to a larger area of output facet 150 (e.g., by not confining the beam inside a core), and also serves, by one or more fused pigtail fiber ports 154, as a pump injection port for counter-propagating pump light (i.e., the pump light injected into any of the pump ports 154 and 174 travels in the opposite direction as the signal light 99), thus providing a reduced interaction length for the highest-power signal light with the fiber material and any non-linear processes. The other aspects of system 103 correspond to like-numbered features of earlier Figures.

FIG. 1E is a schematic plan view (not to scale) of an amplifier system 104 with a plurality of amplifying fiber segments 120 having like-sized cores and a high-NA-core connector segment 170 (having one or more pump-injection ports 173 and/or 174) fused between and connecting each pair of amplifying segments 120, wherein the connector segment 170 is fused on one end to one of the pair of amplifying segments 120, and on the opposite end to the other of the pair of amplifying segments 120. In some embodiments, each amplifying fiber segment 120 includes a core 125 doped with a lasing species, an inner cladding 126 for carrying pump light in a counter-propagating direction, and an outer cladding 127 that contains the pump light within the fiber segment 120. At the joining ends of each segment 120 is a tapered-core segment 160 that guides the light from the core 125 to a smaller core 175 of the high-NA-core connector segments 170 each optionally having one or more co-propagating pump-injection ports 173 and/or optionally having one or more counter-propagating pump-injection ports 174. The high-NA-core connector segments 170 have cores with higher numerical apertures, thus allowing these portions of the fiber to be bent or coiled with little signal loss, while allowing a much-lower NA core 125 in segments 120 to be kept straight (which will naturally have little or no bend loss). As many amplifying segments 120 as desired can be provided, each connected to the next by tapered-core segments 160 and high-NA-core connector segments 170. In some embodiments, each segment 121, 131, or 141 of the previously described FIG. 1A, FIG. 1B, FIG. 1C, and/or FIG. 1D can be composed of a plurality of like-sized-core sub-segments 120 as shown in FIG. 1E (i.e., allowing a more compact form factor with additional pump ports 174), and such multi-sub-segment segments 121, 131, or 141 can be connected with a core-size discontinuity that allows ASE and other backward-traveling light (particularly, the higher-order modes, in some embodiments) to leak out.

In the above-described embodiments, the number of gain segments shown is three; however, other embodiments use a smaller or larger number of gain segments, as suitable for the application. Some embodiments use all-fiber configurations (i.e., fiber for each gain and connecting segment and fiber for each pump, wherein the fibers are fused or otherwise connected to each other). In some such embodiments, star couplers are used when more than two segments are to be connected at one place. In other embodiments, one or more free-space optical units (for example, Fabry-Perot band-pass filters, optical switches, pump-injection blocks and/or other devices that are more efficient or cost effective) are included.

FIG. 2A is a schematic plan view (not to scale) of a MOPA photonic-crystal fiber system 200 with a plurality of fiber segments having different core sizes connected as a power amplifier. In some embodiments, system 200 is quite similar to system 100 of FIG. 1A, except with a substitution (in one or more of the segments) of cores defined by photonic-crystal structures (i.e., longitudinal open (e.g., air-filled) holes or regions of lower index of refraction) rather than solid cores of relatively higher index-of-refraction. Thus, in some embodiments, a master-oscillator seed laser 110 provides a high-quality and relatively low-power laser signal 99 that is launched into the core 225 of a first fiber segment 220. In some embodiments, first optical fiber segment 220 includes a photonic-crystal core 225 (used to carry the optical signal), surrounded by an inner cladding 226 (used to carry the optical pump light and inject it into core 225 over a length), which is in turn surrounded by an outer cladding 227 (used to contain the optical pump light over a length). Similarly, second optical fiber segment 230 includes a photonic-crystal core 235 (having a larger mode area than core 225, and used to carry the optical signal), surrounded by a pump-light-carrying inner cladding 236, which is in turn surrounded by an outer cladding 237 (used to contain the optical pump light over a length), and third optical fiber segment 240 includes a core 245 (having a larger mode area than core 235) used to carry the optical signal), surrounded by an inner cladding 246 (again, used to carry the optical pump light and inject it into core 245 over a length), which is in turn surrounded by an outer cladding 247 (used to contain the optical pump light over a length). In some embodiments, one or more pump diode lasers 122 generate laser light of a pump wavelength (e.g., a wavelength shorter than the signal wavelength, in some embodiments) that is launched into an inner cladding 226 of first fiber segment 220. Similarly, one or more pump diode lasers 132 generate laser light of a pump wavelength that is launched into inner cladding 236 of second fiber segment 230, and one or more pump diode lasers 142 generate laser light of a pump wavelength that is launched into inner cladding 246 of third fiber segment 240. In some embodiments, an end facet 250 is cleaved or polished onto the end of segment 240, wherein facet 250 is angled and/or coated to reduce internal reflection of output beam 299. In some embodiments, one or more features described as associated with system 100 of FIG. 1A are optionally included in system 200.

FIG. 2B is a schematic plan view (not to scale) of a photonic-crystal fiber amplifier system 201 with a plurality of fiber segments having different core sizes, some having ASE-absorbent cladding regions. Segment 221 is similar to segment 220, but with the addition of a ring 228 or other structure in the inner cladding that is doped with a dopant that selectively absorbs light of the signal wavelength (e.g., backwards-traveling ASE 229 that propagated into the inner cladding 226 from a successive photonic-crystal core 235 or 245) while substantially not absorbing light of the pump wavelength. Similarly, segment 231 is similar to segment 230, but with the addition of a ring 238 or other structure in the inner cladding that is doped with a dopant that selectively absorbs light of the signal wavelength (e.g., backwards-traveling ASE 239 that propagated into the inner cladding 236 from a successive photonic-crystal core 245)

while substantially not absorbing light of the pump wavelength. In some embodiments, outer diameters of at least two of the segments are the same dimension (e.g., the outer diameter of segment 221 equals the outer diameter of segment 231, which also equals the outer diameter of segment 241). In some embodiments, one or more segments (e.g., segment 241) do not have an absorbing structure equivalent to absorbing structure 238 or 228. In some embodiments, an endcap 251 is fused to the end of segment 241, where endcap 251 has no defined core (i.e., the index of refraction is not raised in the middle of endcap 251), thus allowing at least some divergence (due to the lack of a defined core) on the output beam 299 before that beam encounters end facet 250. This spreading of the output beam 299 within the endcap 251 lowers the intensity and/or power per unit area of light through the facet 250, thus reducing possible optical damage to the facet 250 due to the high power of the output beam 299. In some embodiments, one or more features described as associated with system 101 of FIG. 1B are optionally included in system 201.

FIG. 2C is a schematic plan view (not to scale) of a photonic-crystal fiber amplifier system 202 with a plurality of amplifying fiber segments (e.g., 221, 230, and 241) having different core sizes, some having ASE-absorbent cladding regions 228, and having a high-NA connector segment 270. In some embodiments, system 202 includes a first amplifying segment 221 (having photonic-crystal core 225, inner cladding 226, absorbing ring 228, and outer cladding 227), which is fused to second amplifying segment 230 (having photonic-crystal core 235, inner cladding 236, and outer cladding 237), which is fused to tapered segment 260 (having a core 265 that tapers to a smaller diameter in the direction of signal travel, inner cladding 266 and outer cladding 267), which is fused to low-bend-loss segment 270 (having a high-NA core 275 that reduces bend losses of signal light, inner cladding 276, and outer cladding 277), which is fused to final amplifying segment 241 (having photonic-crystal core 245, inner cladding 246, and outer cladding 247), which is fused to endcap segment 251 (or formed into endcap 251 by heating the end of photonic-crystal core 245 until its holes melt shut), either of which allows a dispersion or divergence 252 of output beam 299.

Note that in some embodiments, tapered core 265 at its signal input end, has a smaller diameter than photonic crystal segment core 235, but the desired mode of the signal in segment core 235 is concentrated towards its center portion, and the taper is adjusted to match that mode so there is little loss of the signal at the fusion joint between segment core 235 and segment core 265. In some embodiments, segment core 265 is fabricated with a radial doping profile designed to promote propagation of the desired mode (e.g., a certain mode such as LP01, or LP02, or other desired higher-order mode).

Any ASE or other backward-traveling light 229 generated in core 235 or subsequent cores at least partially leaks into inner cladding 226 where it is at least partially absorbed by absorbing ring 228, thus reducing problems that could be caused by such backward-traveling light. Any ASE or other backward-traveling light 239 generated in core 245 at least partially leaks into inner cladding 276 where it is at least partially lost though outer cladding 277 by bending loss, or is later absorbed by absorbing ring 228, thus reducing problems that could be caused by such backward-traveling light. In some embodiments, at least some backward traveling light 249 (e.g., perhaps a portion of signal light that may be reflected by facet 250) leaks out of inner cladding 246 into the external environment, thus reducing problems that could be caused by such backward-traveling light. In some embodiments, one or more features described as associated with system 102 of FIG. 1C are optionally included in system 202.

FIG. 2D is a schematic plan view (not to scale) of a photonic-crystal fiber amplifier system 203 with a plurality of amplifying fiber segments (221, 231, and 241) having different core sizes (in some embodiments, such as shown here, the outer fiber diameters are substantially the same, while in other embodiments, the outer diameters increase in size as the core diameters increase in size) and having ASE-absorbent cladding regions (228, 238, and 248), and two high-NA-core connector segments 270 each having one or more counter-propagating pump-injection ports 274. In some embodiments, an endcap 251 is fused to the final amplifier segment 241 (or the holes of the photonic-crystal core 245 are melted shut), and serves to disperse the output beam power to a larger area of output facet 250, and also serves, by one or more fused pigtail fiber ports 254, as a pump injection port for counter-propagating pump light (i.e., the pump light injected into any of the pump ports 254 and 274 travels in the opposite direction as the signal light 99), thus providing a reduced interaction length for the highest-power signal light with the fiber material and any non-linear processes. The other aspects of system 203 correspond to like-numbered features of earlier Figures. In some embodiments, one or more features described as associated with system 103 of FIG. 1D are optionally included in system 203.

FIG. 2E is a schematic plan view (not to scale) of a photonic-crystal fiber amplifier system 204 with a plurality of amplifying fiber segments 220 having like-sized low-NA cores and a high-NA-core connector segment 270 (having one or more co-propagating pump-injection ports 273) fused between and connecting each pair of amplifying segments 220. In some embodiments, amplifying segment 220A is a first longer length, amplifying segment 220B is a second medium length, and amplifying segment 220C is a third shorter length so that pump power can efficiently provided to the higher and higher signal powers at particular locations in later segments (or pump using different pump wavelengths or different doping species or different doping concentrations), thus increasing overall system efficiency. By pumping separate segments with different pump powers, some embodiments also provide a better and/or more even heat distribution and/or heat sinking. However, the lengths of the segments do not need to be shorter for each following segment. Thus, in other embodiments, each of two or more of the segments in a string of connected segments are of equal length (whether these are successive segments or not), and/or a later segment (relative to the optical signal) is longer than a previous segment. Furthermore, in some embodiments, the core sizes each of two or more of the segments in a string of connected segments are of equal diameter (whether these are successive segments or not), and/or a later segment (relative to the optical signal) can have a core diameter that is smaller than a previous segment In some embodiments, each amplifying fiber segment 220 includes a photonic-crystal core 225 doped with a lasing species, an inner cladding 226 for carrying pump light in a counter-propagating direction, and an outer cladding 227 that contains the pump light within the fiber segment 220. At the joining ends of each segment 220 is a tapered-core segment 260 (e.g., formed, in some embodiments, by heating the ends of connector section 270 in a differential manner (i.e., more heat towards the ends than inward from the ends) until its core doping material diffuses outward into the desired taper) that guides the light from the core 225 to a smaller core 275 of the high-NA-core connector segments 270 each having one or more co-propagating pump injection ports 273. The high-NA-core connector segments 270 have cores with higher numerical apertures, thus allowing these portions of the fiber to be bent or coiled with little signal loss, while allowing a much-lower NA core 225 in segment 220 to be kept straight (which will naturally have little or no bend loss). As many amplifying segments as desired can be provided, each connected to the next by tapered-core segments 260 and high-NA-core connector segments 270. In some embodiments, each segment 221, 231, or 241 of the previously described FIG. 2A, FIG. 2B, FIG. 2C, and/or FIG. 2D can be composed of a plurality of like-sized-core sub-segments 220 as shown in FIG. 2E (i.e., allowing a more compact form factor with additional co-propagating pump ports 273), and one or more such multi-sub-segment segments 221, 231, or 241 can be connected with a core-size discontinuity that allows ASE and other backward-traveling light to leak out as with different cores sized splices as described above. In some embodiments, one or more features described as associated with system 104 of FIG. 1E are optionally included in system 204.

FIG. 2F is a schematic plan view (not to scale) of a photonic-crystal fiber amplifier system 205 with a plurality of amplifying fiber segments (221, 231, and 241) having different core sizes (in some embodiments, the outer fiber diameters are substantially the same, while in other embodiments, the outer diameters increase in size as the core diameters increase in size) and having ASE-absorbent cladding regions (228 and 238), and a prism (or other reflective apparatus) connecting segment 261 (e.g., a prism 261 as shown or other optics that, in some embodiments, include a collimating function (e.g., curved focusing face 259) to properly adjust the desired mode so it enters the next segment 245). In some embodiments, the connecting segment 261 optically connects side-by-side amplifying fiber segments 231 and 241 so that the signal traveling through the core 235 can be reflected in such a way that it flows through core 245 in the opposite direction (the light is turned around a 180-degree turn similar to the function provided by the curved segment 170 of FIG. 1C, but in an even smaller form factor, since the prism 261 can be made much smaller than the curved connecting segment 170), thus shortening the overall amplifier 205 as compared to the embodiment shown in FIG. 2B described above. In some embodiments, the ASE or other backward-traveling light 239 either bypasses the prism (exiting around its sides) or is reflected through the prism connecting segment 261 such that it flows outward into the inner cladding 236 where it is absorbed by signal-wavelength-absorbing structure 238. In some embodiments, at least some backward-traveling light 249 (e.g., perhaps a portion of signal light that may be reflected by facet 250) leaks out of inner cladding 246 into the external environment or is reflected into the external environment by the prism connecting segment 261. The other aspects of system 205 correspond to like-numbered features of earlier FIG. 2B.

FIG. 3A is a schematic plan view (not to scale) of an amplifier system 300 with a plurality of amplifying fiber segments 120 having similar core sizes and one or more high-NA tapered connector segments 160 having a counter-propagating pump injection port 174. In some embodiments, the pump injection port 174 is omitted. In some embodiments, the signal traveling leftward exiting the amplifying fiber segment 120 at the upper right of FIG. 3A enters and is guided by the tapered-core section 160 in the upper middle of FIG. 3A into a smaller core and larger NA section 170 that can be curved or bent to a desired radius with very low bending loss (because of the larger index differential between its core and its cladding, the core of section 170 has a higher numerical aperture (NA), and thus can be bent to allow smaller form factors and different geometric configurations than are available with low-NA sections 160, which must be kept straight to avoid bending losses; and the amplifying fiber segments 120 are made with very low NA in order that only the lowest-order mode or modes are supported). In some embodiments, these fiber sections are clad with a plurality of claddings, in order that the pump light is guided within an inner cladding region and thus can enter the core along its length. In some embodiments, the counter-propagating pump light is injected through a pump pigtail fiber 174 that is fused to a small-core section region such as 170 or the small-core end of a tapered section 160. In some embodiments, the tapered sections are formed by gentle differential heating that diffuses dopants to a profile that creates the desired tapered core. In some embodiments, index-raising dopants in a core region are diffused outwards to enlarge the core size at the large-core end, while in other embodiments, index-lowering dopants in a cladding region are diffused inwards to reduce the core size at the other end.

In some embodiments, the pump light propagates in the same direction as the signal, in order that the high-power signal light does not enter and damage the pump sources. In some embodiments, the pump light propagates in a direction opposite the signal (called counter-propagating), in order that the most pump light is available at the end with the highest signal power, which reduces the interaction length in the fiber for high-power non-linear effects such as four-wave mixing. In some such counter-propagating embodiments, a wavelength-discriminating filter or a one-way optical isolator or other suitable device is used in the pump sources to block substantially all signal light from entering the counter-propagating pump source, which could damage the pump source.

FIG. 3B is a schematic plan view (not to scale) of an amplifier system 301 with a plurality of fiber segments 120, 130, and 140 each having different core sizes, and including a synchronized light gate 315 between at least some of the segments. In some embodiments, high-NA sections (not shown here, but see FIG. 1D and FIG. 3A) are also inserted between segments and/or between portions of segments (e.g., one or more high-NA sections 170 with pump ports 174 can be inserted between subportions of segments 120, 130, and/or 140) in order to inject more pump light and/or change the geometry of system 301). In some embodiments, a pulse-timing circuit 312 provides timing signals to pulsed seed laser 310 (the master oscillator) and to light gate 315. Light gate 315 is substantially opaque and prevents substantially all ASE or other undesired or parasitic light during the time between pulses from traveling either forward or backward between segments, while becoming substantially transparent during the time that the desired amplified pulses are traveling from segment 130 to segment 140 (the power amplifiers). In some embodiments, light gate 315 includes an acousto-optical modulator (AOM), electro-optical modulator (EOM), or other suitable device. Gating the signal pulses reserves the energy from the pump light for use in amplifying the desired pulses while minimizing energy loss to parasitic signals. In some embodiments, one or more additional light gates 315 are inserted at other points along the amplification path. Each light gate has its timing adjusted by pulse-timing circuit 312, in order to be transparent during the time when the pulse reaches that location (which may be several nanoseconds after the time when the seed pulse leaves master oscillator 310, depending on the length and index of refraction of the core sections). In some embodiments, one or more of the amplifying sections have cores that are defined by photonic-crystal structures (e.g., an array of longitudinal holes extending the length of the core). In some embodiments, two or more of the cores of sections 120, 130, or 140 are embedded in a single slab or multi-core fiber. The other aspects of system 301 correspond to like-numbered features of earlier Figures.

FIG. 3C is a schematic plan block diagram (not to scale) of a light gate subsystem 118 for use with a plurality of fiber segments optionally having different core sizes to provide a synchronized light gate 315 between two of the segments. In some embodiments, the signal from a first segment enters the light gate subsystem 118 through a signal line 120, which is connected to the light gate subsystem 118 via a connecting piece 111. In some embodiments, the pump light enters the light gate subsystem 118 through a connecting piece 111 at a right-angle to the direction that the signal flows through light gate subsystem 118. In some embodiments, the signal and the pump light pass in opposite directions through lens 112, with the signal passing left-to-right before passing through a dichroic mirror (or other wavelength-sensitive reflective device) 113, which is substantially transparent to the signal wavelength and highly reflective to the pump wavelength. The signal continues through the light-gate subsystem 118, while the pump light is reflected back into the signal-amplifying fiber 120 to amplify the signal. After passing through the minor 113, the signal passes through a light gate 315. As in FIG. 3B, light gate 315 includes, in some embodiments, an acousto-optical modulator (AOM), electro-optical modulator (EOM), or other suitable device, and is pulsed by a pulse-timing signal generator 312 such that light is transmitted only during the time when the pulse is passing through, but is substantially blocked at all other times. This limits both forward-traveling ASE and backward-traveling ASE at all times except when the signal pulse is expected, thus reducing the power that would otherwise go into amplifying that unwanted ASE. In some embodiments, the signal then passes through a band-pass filter (e.g., in some embodiments, Fabry-Perot frequency filter) 114, which is used to filter out ASE at wavelengths other than the signal wavelength. This reduces ASE within the pulse-timing window for that portion of the ASE at wavelengths other than the signal wavelength. The signal then flows through the right-hand lens 112 and exits from the light gate subsystem 118 through a connecting piece 111 and into signal line 130. In some embodiments, the signal line 130 is the next amplifying fiber segment.

FIG. 3D is a schematic plan view (not to scale) of a laser/amplifier system 303 with an amplifying portion 330 having a plurality of fiber segments (120, 130, and 140) having different core sizes, a plurality of pump ports 174, and a fiber Bragg grating (FBG) at each end. In some embodiments, one or more pump diode lasers 142 connect to the amplifier system 303 via the pump ports 174. In some embodiments, some or all of the pump ports (e.g., 174) propagate the pump light into the inner cladding of the various fiber segments (120, 130, and 140) in a direction opposite to the signal. In some embodiments, the pump ports are counter-propagating pump ports 174 (i.e., where the pump light propagates in the opposite direction in the fiber as the signal) in order to reduce the interaction lengths of undesirable non-linear processes at the highest powers, and to deliver higher pump power to the signal at points where the signal most needs higher power. In other embodiments, such as shown in other figures, the pump ports are co-propagating ports 173 (i.e., where the pump light propagates in the same direction in the fiber as the signal) in order to reduce the risk of light traveling backward into the signal source and damaging it. The left-hand FBG 311 is a highly reflecting fiber Bragg grating (HRFBG), while the right-hand FBG 312 is a relatively low-reflecting fiber Bragg grating (LRFBG), and together provide the feedback mechanism to make system 303 lase (i.e., a mode of the laser will be established, and most of the pump power will go to amplifying this mode); a portion of the mode will exit through LRFBG 312 as the output of the laser. In some embodiments, a non-amplifying segment 319 is fused to the left end of amplifying segment 120, and a non-amplifying segment 339 is fused to the right-hand end of amplifying segment 140. In other embodiments, the entire lengths are amplifying. Other aspects of system 303 are as described for like-numbered elements and functions described above.

FIG. 3E is a schematic plan view (not to scale) of a laser/amplifier system 304 with an amplifying portion 330 having a plurality of fiber segments (120, 130, and 140) having different core sizes, co-propagating pump ports: end-fused-pigtail port 373A, segment-end-side fused-pigtail port 373B, and open-air pump port 373C, and, in some embodiments, a fiber Bragg grating at each end. In some embodiments, one or more pump diode lasers 342 connect to the amplifier system 304 via the co-propagating pump port 373A, pump port 373B, and/or pump port 373C. In some embodiments, pump port 373A is a fiber pigtail fused to the end of segment 120 such that pump light passes through or around HRFBG 311 to pump the amplification of signal in segment 120. In some embodiments, pump port 373B is a fiber pigtail fused to the end of segment 130 such that pump light passes into segment 130 to pump the amplification of signal in segment 130. In some embodiments, pump port 373C is a free-space optical-coupling system (such as a lens 376) that focuses and couples pump light into the end of segment 140 to provide pump light for the amplification of signal in segment 140.

Some embodiments provide a reduction of four-wave mixing (FWM) by induced phase mismatch caused by different core size diameters and dispersion properties of different gain fiber segments. FWM occurs when a phase-matching condition is fulfilled. As shown in the literature (e.g., "Fiber-Based Optical Parametric Amplifiers and their Applications," IEEE J. Quantum Electronic, vol. 8, no 3, pp 506-517, 2002, which is incorporated herein by reference), the gain $g_{FWM}$ for FWM is proportional to $dD/d\lambda$ with D the chromatic dispersion of the fiber and $\lambda$ the wavelength. Also, the waveguide dispersion can be of importance, particularly when the wavelength of the amplified light is close to the zero-dispersion wavelength. In some embodiments, chromatic and waveguide dispersion are used to influence FWM. In some embodiments, the waveguide dispersion is adjusted by varying the radial doping profile (and/or the radial index-of-refraction profile) of the fiber, as is well known in the art. In some embodiments, the chromatic dispersion is adjusted by varying the composition of materials used for the fiber, as is well known in the art.

An example of how the variation of chromatic dispersion and waveguide dispersion affects FWM is shown in the following FIGS. 4A-4D, which show four-wave mixing spectra of four different respective gain fibers with different core diameters. In the examples shown in these figures, the spectral separation of the FWM lobes from the base signal increases with increased core diameter, such that an FWM signal from one segment will not match the FWM-lobe spacing of either the upstream segment (towards the seed source) or the downstream segment (towards the signal output port). Therefore, when the fibers are arranged with increasing core diameter, which corresponds to the arrangement to achieve maximum pulse energy, the FWM contribution of each segment is partially out-of-phase compared to the following segment. Consequently, the FWM contribution from segment n to the following segment n+1 is partially out-of-band and therefore reduced. In the extreme, the signals are completely out-of-band, which should result in maximum suppression of FWM.

FIG. 4A is a graph 400 of power vs. wavelength of an amplifier system using an 8-micron-diameter-core fiber. In some embodiments, the FWM-lobe wavelengths for the 8-micron core diameter are about 15 nm longer or 15 nm shorter than the base signal wavelength (the one used for this test measurement) at 1535 nm.

FIG. 4B is a graph 401 of power vs. wavelength of an amplifier system using a 12-micron fiber. In some embodiments, the FWM-lobe wavelengths for the 12-micron core diameter are about 24 nm longer or 24 nm shorter than the base signal wavelength (the one used for this test measurement) at 1535 nm.

FIG. 4C is a graph 402 of power vs. wavelength of an amplifier system using a 22-micron fiber. In some embodiments, the FWM-lobe wavelengths for the 22-micron core diameter are about 28 nm longer or 28 nm shorter than the base signal wavelength (the one used for this test measurement) at 1535 nm.

FIG. 4D is a graph 403 of power vs. wavelength of an amplifier system using a 25-micron fiber. In some embodiments, the FWM-lobe wavelengths for the 25-micron core diameter are about 34 nm longer or 34 nm shorter than the base signal wavelength (the one used for this test measurement) at 1542 nm.

In some embodiments, the present invention provides reduced spectral broadening based on re-conversion of FWM due to induced phase mismatch. When FWM is not phase matched, i.e., $\Delta k \neq 0$ with $\Delta k = |(2kp-ks-kas)z|$, the nonzero phase match in the z-direction (which is the direction of light propagation), the phase matching diminishes quite dramatically (see, e.g., G. L. Eesley in "Coherent Raman Spectroscopy," Pergamon Press) described by $[\sin(\Delta k\ L/2)/(\Delta k\ L/2)]^2$, which is also know as $[\sin c((\Delta k\ L/2)]^2$. The above phase mismatch leads to back-conversion of the frequency shifted FWM signal (Stokes and anti-Stokes photons) to the photons that are driving the non-linear process, i.e., back into the photons of the signal wavelength that are originally being amplified in the fiber amplifier. This effect can be used by engineering the segments of the segmented gain fiber of the present invention properly and therefore induce back conversion to the pump wavelength into the amplified signal.

In some embodiments, the present invention provides a reduction of other nonlinearities by using specialty fiber segments. Nonlinear fiber processes can be affected by specific fiber parameters. The basic idea is that different segments of the segmented gain fiber (SGF) can be engineered to create the required "difference" between the sections and therefore, certain nonlinearities can be reduced. Examples of such nonlinearities include Stimulated Brillouin Scattering (SBS), Stimulated Raman Scattering (SRS), and Raman gain. The Stimulated-Brillouin-Scattering (SBS) frequency shift is different in different host materials. In some embodiments, when the frequency shift between two segments next to each other is large enough, the SBS gain is out of band and the SBS signal needs to start from noise again. In some embodiments, a short piece of passive (or active) fiber is designed for absorbing the Raman-shifted (SRS) signal wavelength in the fiber and is inserted between the active segments. In some embodiments, long-period gratings are formed on a fiber or other waveguide in the optical path as an optical filter for Raman suppression. In some embodiments, Raman-gain reduction is achieved using FWM. It is known that when FWM phase matching is achieved, then the Raman gain is significantly suppressed (see, e.g., Y. R. Shen, "The Principles of Nonlinear Optics," John Wiley & Sons, 1984, p. 155). To apply this idea, in some embodiments, the dispersion of the fiber is engineered to have an FWM shift that corresponds to the Raman shift, so the Stokes lobe of FWM is identical to the Raman shift. Under this condition, neither Stokes nor anti-Stokes waves should experience an exponential growth. In some such embodiments, the present invention provides no Raman gain and no parametric FWM.

In some embodiments, the different-diameter-core gain segments are fused directly to one another, with no passive fibers being placed between gain sections with different core diameter, thus further reducing nonlinear effects. Typically, optical fiber amplifiers are operated in a saturation regime or close to the saturation regime. To extract more pulse energy, additional amplifier stages have to be used to increase the pulse energy. Multiple amplifier stages have conventionally used passive input fibers and/or pump couplers that end up extending the total fiber length and consequently lead to the build-up of a nonlinear background signal (undesired signals at or near the wavelength of the desired signal). This build-up can significantly change the spectral composition of the output signal, i.e., significant spectral broadening can occur. By fusing the gain fibers directly together, the use of additional coupling fiber is not required. Therefore, the spectral broadening effects are minimized. In some embodiments, an upper limit of achievable gain in an SGF is about 50 dB, which corresponds to the back-reflection losses from fiber components, even cleaved fiber ends.

In some embodiments, the present invention provides a reduction of backward ASE that is otherwise caused by increased core diameter. Typically, ASE clamps (limits) the pulse energy extraction at low repetition rates, and therefore limits the overall achievable pulse energy. By fusion splicing segmented gain fibers that have different core diameters, backward propagating ASE (in particular from higher-order modes in amplifiers that have signal and ASE wavelengths of about 1 micron as well as about 1.5 micron) leaks into the inner cladding of the previous gain fiber section.

The following provides a numerical example: the number of modes N (for a step-index fiber) is $N=0.5*d^2*NA^2*(\pi/\lambda)^2$, wherein d is the core diameter, $\lambda$ is the wavelength, and NA is the numerical aperture. Therefore, the reduction in the number of modes radiating backwards is $(d_{n+1}^2/d_n^2)$ for each segment, assuming that the numerical apertures of the two segments are equal (or $d_{n+1}^2/d_n^2*NA_{n+1}^2/NA_n^2$ if the numerical apertures of the two segments are not equal). Additionally, the ASE gain in the cladding of the double-clad fiber is very small compared to the gain in the core, and thus does not limit the pulse energy extraction in some embodiments of the present invention.

FIG. 1A shows one example of backward-ASE filtering by coupling higher-order ASE modes (which tend to be at the outer diameter of the core) into the cladding of the upstream double-clad gain fiber. FIG. 1A has a first backward-ASE filtering joint between segment 120 and segment 130, and a second backward-ASE filtering joint between segment 130 and segment 140 of a segmented gain fiber, which has standard double cladding.

FIG. 1B shows another example of backward-ASE filtering by coupling higher-order ASE modes into the cladding of an upstream double-clad gain fiber. FIG. 1B has a first backward-ASE filtering joint between segment 121 and segment 131 (both of which include a region doped with ASE absorber), and a second backward-ASE filtering joint between segment 131 and segment 141 of a segmented gain fiber, which has standard double cladding. The ASE leaking into the cladding of segment 121 and segment 131 can be absorbed with proper material doped into the cladding of the double-clad gain fiber.

Reduction of ASE Leads to Reduction of Nonlinear Effects as ASE is Seed Source for Non-Linear Effects.

Nonlinear effects start from thermal noise. In the presence of ASE, all nonlinear effects overlapping with the ASE emission bandwidth of the amplifier/laser will be seeded by the ASE background. Therefore, the threshold for nonlinear effects is reduced by the presence of ASE. In an amplifier/laser and under the condition that the frequency shift caused by the nonlinearity is nested within the gain bandwidth of the amplifier/laser, a variation of the ASE level has significant effect on the onset of the nonlinearity, as the nonlinearity is further amplified by the gain medium. Consequently, the range of operation of the gain fiber without the presence of nonlinear effects is reduced when the ASE level is high. The techniques of the present invention lower the ASE, and therefore increase the threshold for nonlinear effects for this particular configuration. Note: in a strictly passive fiber the sensitivity to the noise source would be significantly less.

Reduction of Forward ASE

Fiber amplifier systems are very sensitive to feedback. In particular all-fiber systems using double-clad fibers and pump couplers. For example, backward propagating ASE can be reflected even from the facets of the diodes used to pump the gain fiber. In the above example the backward ASE contributes to the build-up of forward ASE. Therefore, by minimizing the backward ASE the amount of forward ASE can be significantly reduced.

Increase in Pump-Optical-to-Signal-Optical Efficiency Due to ASE Reduction

The reduction of forward as well as of backward ASE increases the maximal extractable pulse energy and therefore, the overall optical-to-optical efficiency increases.

Pump Feedback Reduction

The pump diodes used to pump the gain fibers are sensitive to optical feedback. By reducing the amount of optical feedback to the diodes the fiber amplifier system can be pumped harder and more energy/average power can be extracted, whereby the diodes are operated with significantly reduced risk of optical damage due to feedback. When using an SGF, a reduction in backward ASE of the pump diodes by a factor of 5-10 was measured for some embodiments, as compared to standard gain fibers. This increases the lifetime of the fiber amplifier/diodes and ensures significantly increased reliability of the fiber system.

Smaller-Core Gain Fiber Seeds Larger-Core Gain Fiber, therefore Good Beam Quality can be Achieved for Large-Core Fibers.

The beam quality is a very critical parameter for many applications. With large-core-diameter fibers it is very difficult to achieve good beam quality. By properly selecting the segments within the SGF each segment becomes the proper seed source for its following segment. Therefore, this technique allows using higher NA fibers, as good beam quality can be achieved with high-NA gain fibers as long as the core diameter is sufficiently small—this is important for the first segment. Therefore, highly optimized gain fibers, which typically have an NA which by far exceeds the NA requirement for a large core diameter to operate the corresponding fiber on the fundamental mode, can be used and operated with significantly improved beam quality. Operating the fiber amplifier with a good and stable beam quality also means that the power fluctuations are reduced.

FWM Reduced as Number of Higher-Order Fiber Modes is Reduced

By improving the beam quality as described above, the threshold of wave-vector-sensitive nonlinear processes (passive processes) which require phase matching is reduced. As an example, four-wave mixing (FWM) requires phase matching which can be achieved by the interaction of different modes within the fiber as higher-order modes have different wave vectors. When the amplifier is operated on lower-order modes and saturated by those modes, the higher-order modes will experience reduced gain. Even when the amplified signal operates on the fundamental mode the Stokes/anti-Stokes photons can occur in higher-order modes; however, by saturating the amplifier as described above these photons/fields experience reduced gain and therefore FWM is reduced.

Compatibility with Different Cladding Diameters of Described Technique.

Typically, larger-core-diameter gain fibers require larger cladding diameters to balance the pump/signal absorption. The described technique of some embodiments is compatible with the increase in cladding diameters since the pump light is coupled into the double cladding with a lower brightness waveguide, and therefore the pump light losses are minimized, which in turn maintains the optical-to-optical efficiency.

Segmented Gain Fiber (SGF) with Different Core Diameters and Cladding Diameters.

An additional benefit of the above-described approach of using different cladding diameters is that ASE traveling backward in the cladding is suppressed, since the backward-traveling ASE leaks out at the fusion joint between the different-sized double-clad segments, similar to the manner discussed for backward-traveling core-ASE suppression. In some embodiments, the suppression ratio is $(d_{n+1}^2/d_n^2)$ for each segment, assuming that the numerical apertures of the two segments are equal (or $d_{n+1}^2/d_n^2 * NA_{n+1}^2/NA_n^2$ if the numerical apertures of the two segments are not equal), with each d being the double cladding diameter of the respective segment n+1 and n, and each NA being the numerical aperture of the respective segment n+1 and n.

Modified Pumping Scheme

As mentioned above, larger cladding diameters are compatible with the technique of the present invention. This benefit allows also pumping of certain sections of the hybrid gain fiber selectively.

By pumping separate segments with different pump powers, some embodiments also provide a better and/or more even heat distribution and/or heat sinking, avoiding certain heat-dissipation problems.

All-Fiber Gain Module with Tapered Fiber Bundle and Selective Pumping of a Segment of the Segmented Gain Fiber (SGF).

With the approach shown above the last section of the SGF is pumped by using two pump diodes. More pump diodes are possible depending on the geometry of the fibers. The advantage of this approach is that the pump power is delivered to the segment of the fiber where power extraction takes place and ASE is minimized.

The described scheme can also be applied to pump the last section of the SGF in a counter-propagating scheme as shown herein.

All-Fiber Gain Module with Tapered Fiber Bundle and Selective Pumping of the Last Segment of the Segmented Gain Fiber.

This approach has the additional advantage of increasing the efficiency of the last gain section by pumping in a counter-propagating scheme (5% efficiency increase) and reducing the effective nonlinear interaction length within the last section of the gain fiber. Consequently, more peak power/pulse energy can be generated. This is especially useful with next-generation laser diodes now becoming available that can generate 50 watts compared to 10 watts previously available.

Tailored Inversion Distribution Along the Gain Fiber

By pumping each segment separately a specific inversion within the gain fiber can be tailored. For example: even when pumping in a co-propagating scheme by distributing the pump power in an appropriate way for each of the segments, a quasi counter-propagating inversion can be achieved. The advantage is that the interaction length for nonlinear effects is thereby reduced, which reduces the onset of nonlinear effects and, most likely, the build-up of ASE is also reduced. In some embodiments, pump side couplers are used for this approach.

Extending the Pulse Energy Extraction Limitation by Minimizing In-Band ASE

In sequential amplifier systems filtering between the stages is required. The described SGF amplifier also needs a seed signal that is generated with a number of optical amplifiers. The advantages described above enable the operation of a fiber amplifier with significantly reduced out-of-band ASE, i.e. high energy extraction; however, the in-band ASE, defined by the bandwidth of the filters used to filter the out-of-band ASE, imposes the final limitation for pulse-energy extraction and is currently the limitation of pulse-energy extraction. An optical switch, i.e. time gate, which only opens when the pulses are present, minimizes the in-band ASE. The time gate can be located in front of the input of the hybrid gain module, however, each amplifier contributes a certain amount of ASE (CW background). Therefore, the ideal location for a time gate is between the second-to-the-last and the last segment of the SGF where the power extraction takes place.

SGF Amplifier Approach with Integrated Time-Gate Element in Front of the Last Gain Fiber Segment.

In some embodiments (such as shown in FIG. 3B and FIG. 3C, described above), the segmented-gain-fiber approach includes a time-gate element in one or more locations along the gain path in order to stop light (such as ASE) from being propagated to adjacent segments between the times that the desired pulses are passing, thus preserving pump power for amplifying the desired pulses.

Application of the Hybrid Gain Fiber for a Fiber Laser

The described benefits can also be applied to a fiber laser such as shown in FIG. 3D and FIG. 3E, described above. The basic assumption here is that when the gain fiber segments are properly designed, i.e. the mode field diameters are properly matched, the light can propagate forth and back with only minor losses.

Fiber Laser with Segmented Fiber and Feedback Supplied by One High-Reflectivity (HR) and One Low-Reflectivity (LR) Fiber Bragg Grating.

Figure 5D:
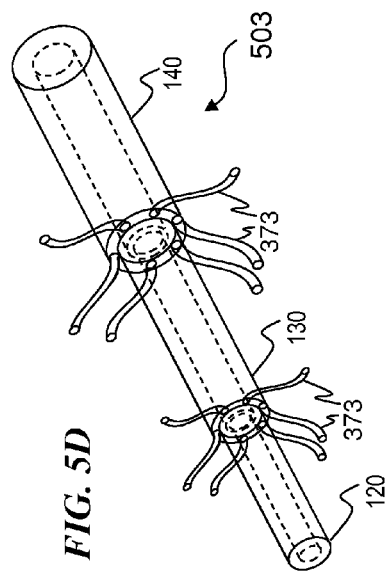
FIG. 5D is a schematic perspective view (not to scale) of an amplifier system 503.
Figure 5A:
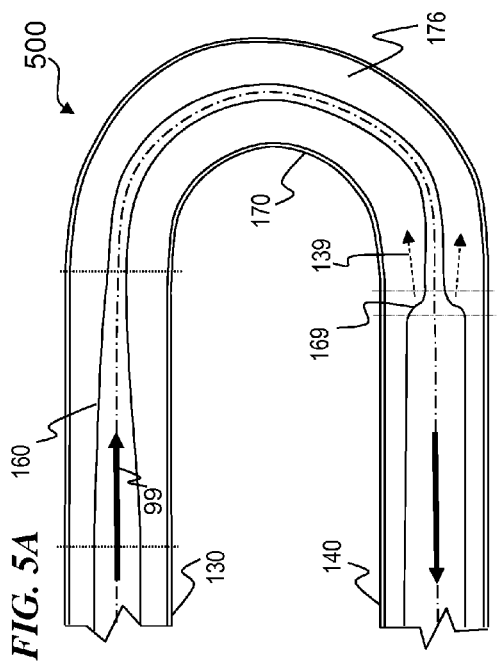
FIG. 5A is a schematic plan view (not to scale) of an amplifier system 500.

FIG. 5A is a schematic plan view (not to scale) of an amplifier system 500 with two amplifying fiber segments (130 and 140) having different core sizes (in order to reduce four-wave mixing), two tapered-core segments (160 and 169), and a high-NA connector segment 170. In some embodiments, the tapered-core segments are formed by heating the ends of connector segment 170 in a differential manner (i.e., more heat towards the ends than inward from the ends) until its core doping material diffuses outward into the desired taper. The high-NA-core connector segment 170 has a core with higher numerical aperture, thus allowing this portion of the fiber to be bent or coiled with little signal loss. In some embodiments, the tapered-core segment 160 has a long transition length, while the tapered-core segment 169 has a short transition length. The short transition length of tapered core segment 169 helps to ensure that the ASE 139 flowing backwards through the amplifier system 500 enters the inner cladding 176 of tapered segment 169 and connector segment 170.

FIG. 5B is a schematic plan view (not to scale) of an amplifier system 501 with two amplifying fiber segments having different core sizes (130 and 140, in order to reduce four-wave mixing), and a tapered-core segment 169. In some embodiments, the ASE 139 flowing backwards through the amplifier system 501 enters the inner cladding 136 of fiber segment 130.

Figure 5C:
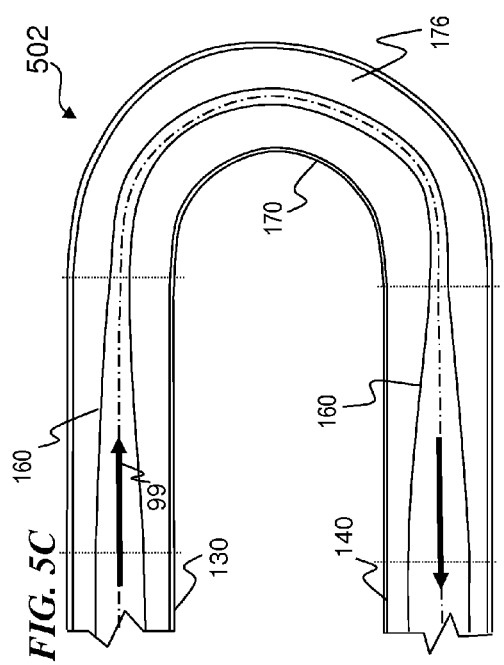
FIG. 5C is a schematic plan block diagram (not to scale) of an amplifier system 502.

FIG. 5C is a schematic plan view (not to scale) of an amplifier system 502. In some embodiments, system 502 uses two amplifying fiber segments (130 and 140) having different core sizes (in order to reduce four-wave mixing), two tapered-core segments 160, and a high-NA connector segment 170. In some embodiments, the tapered-core segments 160 have the same transition length. In some embodiments, the two amplifying segments 130 and 140 have the same core sizes (i.e., in some embodiments, these two segments having equal core sizes are portions of what can be considered a single longer segment, and that can be connected in series with other segments having different core sizes, in order to reduce the four-wave mixing non-linearities discusses herein).

FIG. 5D is a schematic perspective view (not to scale) of an amplifier system 503 with a plurality of fiber segments having different core sizes (120, 130, and 140), and a plurality of pump ports 373. In some embodiments, some or all of the pump ports 373 are co-propagating (i.e., where the pump light propagates in the same direction in the fiber as the signal) in order to reduce the risk of light traveling backward into the pump source(s) and damaging the pump source(s). In other embodiments, some or all of the pump ports are counter-propagating (i.e., where the pump light propagates in the opposite direction in the fiber as the signal) such as shown in FIG. 3D in order to reduce the interaction lengths of undesirable non-linear processes at the highest powers, and to deliver higher pump power to the signal at points where the signal most needs higher power.

In some embodiments, a multi-clad fiber having a plurality of glass claddings is used as one or more of the segments in any of the described embodiments, wherein in some embodiments, the outermost cladding (i.e., the coating of the pump waveguide) is a glass or other high-temperature-stable material that has a much lower index of refraction in order to define the NA of the pump waveguide sufficiently large to have a reasonably bright pump power. In such fibers, typically called "triple-clad fibers," an all-glass inner structure is used, rather than a pump-light-containing pump-guide outer polymer cladding that has contact with the pump light, as used in conventional double-clad fibers. That is, the triple-clad fiber has a glass inner cladding to contain the signal light in the core (in some embodiments, the glass inner cladding has an index of refraction that is lower than the index of refraction of the core), and a glass outer cladding used to contain pump light in the inner cladding (in some embodiments, the glass outer cladding has an index of refraction that is lower than the index of refraction of the glass inner cladding). An outermost cladding of polymer is provided in some embodiments, to provide physical protection to the glass inner portion. The glass outer cladding of such a fiber can be touched and handled by fingers (even when the polymer outermost cladding is removed), providing better manufacturing due to easier handling capabilities for welding to fixtures or other processing steps. In some embodiments, the all-glass (relative to the portions that provide guiding properties, i.e., since the outer surface of the outer glass cladding is not used to contain light, light interactions do not directly damage the polymer) fiber provides the capability for much higher power, partially due to the higher temperature stability of the glass outer coating as compared to a polymer-clad double-clad fiber of conventional construction, and especially due to the separation between the guided pump light in the inner glass cladding and the polymer that is outside the outer glass cladding.

In some embodiments, the present invention includes a method that includes providing a plurality of amplifying fiber segments including a first segment and a second segment; coupling pump light into a core of the first segment and into a core of the second segment; coupling signal light from the core of the first segment into the core of the second segment; and amplifying the signal light in the first segment and in the second segment, wherein a wavelength shift of a non-linear frequency-shifted characteristic of the first segment is different than a wavelength shift of a non-linear frequency-shifted characteristic of the second segment.

In some embodiments, the non-linear frequency-shifted characteristic is or includes the wavelength spacing of the four-wave-mixing lobe (i.e., the wavelength spacing of the four-wave-mixing lobe of the first segment is not equal to the wavelength spacing of the four-wave-mixing lobe of the second segment). In other embodiments, the non-linear frequency-shifted characteristic is or includes the SBS frequency shift (i.e., the SBS frequency shift of the first segment is not equal to the SBS frequency shift of the second segment). In still other embodiments, the non-linear frequency-shifted characteristic is or includes the stimulated Raman scattering (SRS) frequency shift (e.g., by using a fiber segment, such as the last fiber segment, wherein that segment is more leaky of the frequency of the SRS-frequency-shifted wavelength than are other segments). In some embodiments, the fiber core doping profile and/or index-of-refraction profile of one or more segments is engineered to shift the zero-dispersion wavelength by proper doping (i.e., adjusting the species, concentration, or radial profile of the dopant(s)), or by making use of the modal dispersion of one or more higher-order modes to avoid four-wave-mixing buildup (since higher-order modes have different dispersion characteristics). In some embodiments, the non-linear frequency-shifted characteristic is a combination of two or more such effects and/or other effects.

In some embodiments of the method, the plurality of amplifying fiber segments further includes a third segment, and the method further includes coupling pump light into a core of the third segment; and coupling signal light from the core of the second segment into a core of the third segment, wherein a wavelength spacing of a four-wave-mixing lobe of the third segment is different than a wavelength spacing of a four-wave-mixing lobe of the second segment and a four-wave-mixing lobe of the first segment.

In some embodiments of the method, the coupling of signal light is accomplished without passing the signal light across a gap. In some such embodiments, the coupling of signal light is accomplished using a coupling fiber segment that is fused between the second fiber segment and the first segment. In some such embodiments, the coupling of signal light is accomplished using a prism. In some embodiments, the prism includes a collimating function. In some such embodiments, the collimating function includes a curved focussing prism face.

Some embodiments of the method further include defining one or more photonic-crystal-core characteristics by a pattern of holes in the second segment.

Some embodiments of the method further include providing light feedback to define a lasing cavity that includes the first and second segments.

In some embodiments, the providing of light feedback includes using a fiber Bragg grating.

Some embodiments of the method further include gating light transmission between the first fiber segment and second fiber segment such that more light is transmitted during a signal-pulse time as compared to light transmitted at other times.

Some embodiments of the method further include coupling backward-traveling amplified spontaneous emission from the core of the second segment into a cladding of the first segment.

Other embodiments of the invention include an apparatus that includes an optical-fiber amplifier having a plurality of fiber segments including a first segment and a second segment, wherein light from a core of the first segment is coupled into a core of the second segment, and wherein a wavelength spacing of a four-wave-mixing lobe of the first segment is different than a wavelength spacing of a four-wave-mixing lobe of the second segment.

In some embodiments of the apparatus, the plurality of fiber segments further includes a third segment, wherein light from the core of the second segment is coupled into a core of the third segment, and wherein a diameter of the core of the third segment is larger than the diameter of the core of the second segment.

In some embodiments of the apparatus, an end of the second segment is fused directly to an end of the first segment.

In some embodiments of the apparatus, an end of the second segment is fused to a first end of a coupling fiber segment, and a second end of the coupling segment is fused to an end of the first segment.

In some embodiments of the apparatus, an end of the second segment is fused to a prism segment and the prism segment is fused to an end of the first segment.

In some embodiments of the apparatus, the second segment includes a photonic-crystal core having one or more characteristics defined by a pattern of holes in the second segment.

In some embodiments, the apparatus further includes a feedback mechanism that defines a laser cavity that includes the first and second segments. In some embodiments, the feedback mechanism includes a fiber Bragg grating.

In some embodiments of the apparatus, the non-linear frequency-shifted characteristic of the first segment includes a wavelength spacing of a four-wave-mixing lobe defined at least in part by a core size of the first segment, and the non-linear frequency-shifted characteristic of the second segment includes a wavelength spacing of a four-wavemixing lobe defined at least in part by a core size of the second segment, and wherein the lobe spacing of the first segment is not equal to the lobe spacing of the second segment.

In some embodiments, the apparatus further includes a light gate that increases light transmission between the first fiber segment and second fiber segment during a signal-pulse time as compared to other times.

In some embodiments, the first and second segments are configured such that at least some backward-traveling amplified spontaneous emission is coupled from the core of the second segment into a cladding of the first segment.

Yet other embodiments of the invention include an apparatus that includes a plurality of amplifying fiber segments including a first segment and a second segment; a pump-light source operatively coupled to provide pump light into a core of the first segment and into a core of the second segment; structures and means as described herein for coupling signal light from a core of the first segment into a core of the second segment; and structures and means as described herein for reducing a wavelength-shifting non-linear effect, such as, for example, four-wave-mixing, SBS, SRS and the like.

In some embodiments, the means for coupling signal light includes a coupling fiber segment that is fused to both the first segment and the second segment, and between the second segment and the first segment.

In some embodiments, the means for coupling signal light includes a prism.

Some embodiments further include means for defining one or more photonic-crystal-core characteristics in the second segment.

Some embodiments further include means for providing light feedback to define a lasing cavity that includes the first and second segments.

In some embodiments, the means for providing light feedback includes a fiber Bragg grating.

In some embodiments, the non-linear frequency-shifted characteristic of the first segment includes a wavelength spacing of a four-wave-mixing lobe defined at least in part by a core size of the first segment, and the non-linear frequency-shifted characteristic of the second segment includes a wavelength spacing of a four-wave-mixing lobe defined at least in part by a core size of the second segment, and wherein the lobe spacing of the first segment is not equal to the lobe spacing of the second segment.

Some embodiments further include means for gating light transmission between the first fiber segment and second fiber segment such that more light is transmitted during a signal-pulse time as compared to light transmitted at other times.

Some embodiments further include means for coupling backward-traveling amplified spontaneous emission from the core of the second segment into a cladding of the first segment.

Still other embodiments of the invention include an apparatus that includes an optical-fiber amplifier having a plurality of fiber segments including a first segment and a second segment, wherein light from a core of the first segment is coupled into a core of the second segment without crossing an air gap, and wherein a diameter of the core of the second segment is larger than the diameter of the core of the first segment.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
an optical-fiber laser having a plurality of optically coupled gain-fiber segments, including:
a first gain-fiber segment, wherein the first segment has a first core that is surrounded by a first inner cladding, wherein the first inner cladding is surrounded by a first outer cladding, wherein a first end of the first gain-fiber segment includes a first reflector;
a connecting segment; and
a second gain-fiber segment that is joined to the first segment via the connecting segment, wherein the second segment includes a second core that is surrounded by a second inner cladding, wherein the second inner cladding is surrounded by a second outer cladding, wherein a second distal end of the second gain-fiber segment includes a second partially-transmissive reflector, wherein an outer diameter of the first inner cladding of the first gain-fiber segment at its connection to the connecting segment is smaller than an outer diameter of the second inner cladding of the second gain-fiber segment at its connection to the connecting segment, wherein signal light of a signal-light wavelength is coupled into the first core, and wherein the signal light is coupled from the first core into the second core.

2. The apparatus of claim 1, wherein the first reflector includes a fiber-Bragg grating.

3. The apparatus of claim 1, wherein the first reflector includes a high-reflectivity fiber-Bragg grating.

4. The apparatus of claim 1, wherein the second partially-transmissive reflector includes a fiber-Bragg grating.

5. The apparatus of claim 1, wherein the second partially-transmissive reflector includes a low-reflectivity fiber-Bragg grating.

6. The apparatus of claim 1, wherein the first reflector includes a high-reflectivity fiber-Bragg grating, and wherein the second partially-transmissive reflector includes a low-reflectivity fiber-Bragg grating.

7. The apparatus of claim 1, further comprising a plurality of pump-light-input ports joined to the optical-fiber amplifier, wherein the plurality of pump-light-input ports includes a fiber pigtail-fused to an end of the first gain-fiber segment.

8. The apparatus of claim 1, further comprising a plurality of pump-light-input ports joined to the optical-fiber amplifier, wherein the plurality of pump-light-input ports includes a free-space optical-coupling system.

9. The apparatus of claim 1, further comprising a plurality of pump-light-input ports joined to the optical-fiber amplifier, wherein the signal light propagates through the optical-fiber amplifier in a first direction, and wherein pump light is injected into the second inner cladding from the plurality of pump-light-input ports at or near an end of the second inner cladding and counter-propagates in a second direction, opposite the first direction.

10. The apparatus of claim 1, further comprising a plurality of pump-light-input ports joined to the optical-fiber amplifier, wherein the signal light propagates through the optical-fiber amplifier in a first direction, and wherein pump light is injected into an end of the second inner cladding from the plurality of pump-light-input ports and co-propagates in the first direction.

11. The apparatus of claim 1, wherein the connecting segment includes a third core that is surrounded by a third inner cladding, wherein the third inner cladding is surrounded by a third outer cladding, wherein the outer diameter of the second core of the second gain-fiber segment at its connection to the connecting segment is larger than an outer diameter of the third core of the connecting segment, wherein the signal light is coupled from the first core to the third core and from the third core to the second core.

12. A method comprising:
providing an optical-fiber laser that includes a plurality of amplifying fiber segments including a first amplifying segment and a second amplifying segment that are joined to one another at a connecting segment, wherein the first amplifying segment includes a first core that is surrounded by a first inner cladding, wherein the first inner cladding is surrounded by a first outer cladding, wherein the second amplifying segment includes a second core that is surrounded by a second inner cladding, wherein the second inner cladding is surrounded by a second outer cladding, wherein an outer diameter of the first inner cladding of the first amplifying segment at its connection to the connecting segment is smaller than an outer diameter of the second inner cladding of the second amplifying segment at its connection to the connecting segment;
coupling signal light of a signal-light wavelength into the first core;
amplifying the signal light in the first amplifying segment to generate first-amplified signal light;
coupling the first-amplified signal light from the first core into the second core;
further amplifying the first-amplified signal light in the second segment to generate second-amplified signal light;
reflecting at least a portion of the signal light at a first end of the first segment; and
reflecting at least a portion of the signal light and transmitting at least a portion of the signal light at a second distal end of the second segment in order to provide lasing of the signal light.

13. The method of claim 12, further comprising:
providing a plurality of pump-light-input ports joined to the optical-fiber amplifier, wherein the providing includes pigtail fusing a fiber to the first end of the first amplifying segment; and
injecting pump light through the plurality of pump-light-input ports.

14. The method of claim 12, further comprising:
injecting pump light into the optical-fiber amplifier through a free-space optical-coupling system.

15. The method of claim 12, wherein the signal light propagates through the plurality of amplifying fiber segments in a first direction, the method further comprising:
providing a plurality of pump-light-input ports joined to the optical-fiber amplifier; and
injecting pump light at or near an end of the second inner cladding from the plurality of pump-light-input ports such that the pump light counter-propagates in a second direction, opposite the first direction.

16. The method of claim 12, wherein the signal light propagates through the plurality of amplifying fiber segments in a first direction, the method further comprising:
providing a plurality of pump-light-input ports joined to the optical-fiber amplifier; and
injecting pump light into an end of the second inner cladding from the plurality of pump-light-input ports such that the pump light co-propagates in the first direction.

17. The method of claim 12, wherein the reflecting of at least a portion of the signal light at the first end of the first segment includes fiber-Bragg reflecting at least a portion of the signal light at the first end of the first segment.

18. The method of claim 12, wherein the reflecting of at least a portion of the signal light and transmitting of at least a portion of the signal light at the second distal end of the second segment includes fiber-Bragg reflecting at least a portion of the signal light and transmitting at least a portion of the signal light at the second distal end of the second segment.

19. The method of claim 12, wherein the reflecting of at least a portion of the signal light at the first end of the first segment includes fiber-Bragg reflecting at least a portion of the signal light at the first end of the first segment, and wherein the reflecting of at least a portion of the signal light and transmitting of at least a portion of the signal light at the second distal end of the second segment includes fiber-Bragg reflecting at least a portion of the signal light and transmitting at least a portion of the signal light at the second distal end of the second segment.

20. An apparatus comprising:
a plurality of amplifying fiber segments that includes a first amplifying segment and a second amplifying segment that are joined to one another via a connecting segment, wherein the first amplifying segment includes a first core that is surrounded by a first inner cladding, wherein the first inner cladding is surrounded by a first outer cladding, wherein the second segment includes a second core that is surrounded by a second inner cladding, wherein the second inner cladding is surrounded by a second outer cladding, wherein an outer diameter of the first inner cladding of the first amplifying segment at its connection to the connecting segment is smaller than an outer diameter of the second inner cladding of the second amplifying segment at its connection to the connecting segment;
means for amplifying signal light in the first amplifying segment to generate first-amplified signal light;
means for coupling the first-amplified signal light from the first core into the second core;
means for further amplifying the first-amplified signal light in the second amplifying segment to generate second-amplified signal light;
means for reflecting at least a portion of the signal light at a first end of the first segment; and means for reflecting at least a portion of the signal light and transmitting at least a portion of the signal light at a second distal end of the second segment in order to provide lasing of the signal light.

21. The apparatus of claim 20, further comprising:
means for selectively absorbing light of the signal wavelength in the first inner cladding of the first amplifying segment.

* * * * *